(12) United States Patent
Atarashi et al.

(10) Patent No.: US 8,030,816 B2
(45) Date of Patent: Oct. 4, 2011

(54) MOTOR AND MOTOR CONTROL DEVICE

(75) Inventors: Hirofumi Atarashi, Shioya-gun (JP);
Keiichi Yamamoto, Haga-gun (JP);
Shoei Abe, Kawachi-gun (JP); Shigeru Tajima, Tokorozawa (JP)

(73) Assignee: Honda Motor Co., Ltd., Tokyo (JP)

( * ) Notice: Subject to any disclaimer, the term of this patent is extended or adjusted under 35 U.S.C. 154(b) by 86 days.

(21) Appl. No.: 12/303,505

(22) PCT Filed: Mar. 23, 2007

(86) PCT No.: PCT/JP2007/056003
§ 371 (c)(1),
(2), (4) Date: Dec. 4, 2008

(87) PCT Pub. No.: WO2007/141948
PCT Pub. Date: Dec. 13, 2007

(65) Prior Publication Data
US 2009/0251021 A1    Oct. 8, 2009

(30) Foreign Application Priority Data

Jun. 6, 2006 (JP) ................................. 2006-157066
Sep. 25, 2006 (JP) ................................. 2006-259543

(51) Int. Cl.
*H02K 1/27* (2006.01)
(52) U.S. Cl. .............. 310/156.36; 310/156.35; 310/209; 310/268
(58) Field of Classification Search ............. 310/156.12, 310/156.32, 156.35, 156.38, 156.43, 156.53–156.56, 310/156.82, 166, 168, 216.069–216.075, 310/216.111, 216.112, 267–268, 156.36, 310/209
See application file for complete search history.

(56) References Cited

U.S. PATENT DOCUMENTS

| 336,087 | A | 2/1886 | Brush |
| 2,154,146 | A | 4/1939 | Becker |
| 2,632,861 | A | 3/1953 | Morton et al. |

(Continued)

FOREIGN PATENT DOCUMENTS

EP    1 612 913 A2    1/2006

(Continued)

OTHER PUBLICATIONS

Z.Q. Zhu, Influence of Design Parameters on Cogging Torque in Permanent Magnet Machines, IEEE Transactions on Energy Conversion, vol. 15, No. 4, Dec. 2000, pp. 407-412.

(Continued)

*Primary Examiner* — Tran N Nguyen
(74) *Attorney, Agent, or Firm* — Arent Fox LLP

(57) ABSTRACT

A rotor (11) is provided with: a main permanent magnet mounting layer (21) having a plurality of main permanent magnets (21a) mounted thereon; a first sub permanent magnet mounting layer (22) having a plurality of first sub permanent magnets (22a) mounted thereon; a second sub permanent magnet mounting layer (23) having a plurality of second sub permanent magnets (23a) mounted thereon; and a phase change mechanism capable, by turning at least either one of the first sub permanent magnet mounting layer (22) and the second permanent magnet mounting layer (23), and the main permanent magnet mounting layer (21) about the rotational axis, of changing the relative phase between the first sub permanent magnet mounting layer (22) and the second permanent magnet mounting layer (23), and the main permanent magnet mounting layer (21).

11 Claims, 19 Drawing Sheets

U.S. PATENT DOCUMENTS

| | | | |
|---|---|---|---|
| 3,108,200 A | 10/1963 | Baldwin | |
| 3,465,188 A | 9/1969 | Sisk | |
| 3,591,819 A | 7/1971 | Laing et al. | |
| 3,762,042 A | 10/1973 | Abe et al. | |
| 3,956,651 A | 5/1976 | Brammerlo | |
| 4,007,387 A | 2/1977 | Rustecki | |
| 4,095,150 A | 6/1978 | Senckel | |
| 4,363,988 A | 12/1982 | Kliman | |
| 4,410,820 A | 10/1983 | Stanley | |
| 4,864,175 A | 9/1989 | Rossi | |
| 4,996,457 A | 2/1991 | Hawsey et al. | |
| 5,142,179 A | 8/1992 | Nakamura et al. | |
| 5,245,238 A | 9/1993 | Lynch et al. | |
| 5,334,899 A | 8/1994 | Skybyk | |
| 5,387,854 A | 2/1995 | McCleer et al. | |
| 5,394,321 A | 2/1995 | McCleer et al. | |
| 5,397,953 A | 3/1995 | Cho | |
| 5,642,009 A | 6/1997 | McCleer et al. | |
| 5,671,524 A | 9/1997 | Damsky et al. | |
| 5,731,649 A | 3/1998 | Caamano | |
| 5,757,108 A | 5/1998 | Suzuki | |
| 5,907,210 A | 5/1999 | Chaix | |
| 5,925,965 A | 7/1999 | Li et al. | |
| 5,955,809 A | 9/1999 | Shah | |
| 6,034,459 A | 3/2000 | Matsunobu et al. | |
| 6,373,162 B1* | 4/2002 | Liang et al. | 310/156.53 |
| 6,739,034 B2 | 5/2004 | Suzuki et al. | |
| 6,809,453 B2 | 10/2004 | Narita et al. | |
| 6,919,663 B2 | 7/2005 | Iles-Klumpner | |
| 6,960,860 B1 | 11/2005 | DeCristofaro et al. | |
| 6,995,494 B2 | 2/2006 | Haugan et al. | |
| 7,144,468 B2 | 12/2006 | DeCristofaro et al. | |
| 7,230,359 B2 | 6/2007 | Iles-Klumpner | |
| 7,230,361 B2 | 6/2007 | Hirzel | |
| 7,315,102 B2 | 1/2008 | Minagawa | |
| 7,679,260 B2* | 3/2010 | Yamamoto et al. | 310/268 |
| 2004/0070307 A1 | 4/2004 | Haugan et al. | |
| 2005/0194855 A1 | 9/2005 | Hasebe et al. | |
| 2005/0285467 A1* | 12/2005 | Shimizu | 310/156.35 |
| 2006/0028093 A1 | 2/2006 | Minagawa et al. | |
| 2006/0238056 A1 | 10/2006 | Alvarez et al. | |
| 2006/0273676 A1 | 12/2006 | Naruse et al. | |
| 2006/0284507 A1 | 12/2006 | Murakami | |
| 2007/0018520 A1 | 1/2007 | Kaneko et al. | |
| 2007/0080598 A1 | 4/2007 | Naruse | |
| 2007/0170802 A1 | 7/2007 | Potoradi | |
| 2008/0129136 A1* | 6/2008 | Abe et al. | 310/156.35 |
| 2008/0290752 A1* | 11/2008 | Yamamoto et al. | 310/156.36 |
| 2009/0243422 A1* | 10/2009 | Atarashi et al. | 310/216.074 |
| 2009/0295245 A1* | 12/2009 | Abe et al. | 310/156.35 |
| 2009/0295246 A1* | 12/2009 | Abe | 310/156.35 |
| 2010/0090555 A1* | 4/2010 | Tajima et al. | 310/156.35 |
| 2010/0117474 A1 | 5/2010 | Atarshi et al. | |
| 2010/0141075 A1 | 6/2010 | Atarashi et al. | |
| 2010/0187933 A1 | 7/2010 | Yamamoto et al. | |
| 2010/0219710 A1 | 9/2010 | Kawamura et al. | |
| 2010/0231079 A1 | 9/2010 | Abe et al. | |

FOREIGN PATENT DOCUMENTS

| | | |
|---|---|---|
| EP | 1 850 451 A1 | 10/2007 |
| JP | 55-053161 A | 4/1980 |
| JP | 59-144352 A | 8/1984 |
| JP | 59-230453 | 12/1984 |
| JP | 02-079174 U | 6/1990 |
| JP | 6-500457 A | 1/1994 |
| JP | 6-205554 A | 7/1994 |
| JP | 9-168263 A | 6/1997 |
| JP | 10-164779 | 6/1998 |
| JP | 10-271784 | 10/1998 |
| JP | 3062085 U | 6/1999 |
| JP | 11-299199 | 10/1999 |
| JP | 11-511948 A T | 10/1999 |
| JP | 2000-197301 A | 7/2000 |
| JP | 2001-057753 A | 2/2001 |
| JP | 2001-136721 | 5/2001 |
| JP | 2001-251817 | 9/2001 |
| JP | 2002-112481 A | 4/2002 |
| JP | 2005-143288 | 2/2005 |
| JP | 2005-094955 | 4/2005 |
| JP | 2005-269778 | 9/2005 |
| JP | 2005-304245 A | 10/2005 |
| JP | 2005-318782 A | 11/2005 |
| JP | 2005-341696 | 12/2005 |
| JP | 2006-25482 A | 1/2006 |
| JP | 2006-166635 | 6/2006 |
| JP | 2006-222131 A | 8/2006 |
| JP | 2000-262026 A | 9/2006 |
| JP | 2006-527578 T | 11/2006 |
| JP | 2006-345627 | 12/2006 |
| JP | 2007-028869 | 2/2007 |
| JP | 2007-37210 A | 2/2007 |
| JP | 2007-53844 A | 3/2007 |
| JP | 2007-089270 A | 4/2007 |
| JP | 2007-104819 A | 4/2007 |
| JP | 2007-151321 | 6/2007 |
| JP | 2007-215291 A | 8/2007 |
| JP | 2008-022663 A | 1/2008 |
| JP | 2008-48497 A | 2/2008 |
| JP | 2008-104278 | 5/2008 |
| JP | 2008-167639 A | 7/2008 |
| WO | WO 92/20131 | 12/1992 |
| WO | WO 96/29774 A1 | 9/1996 |
| WO | WO 2004/109894 A1 | 12/2004 |
| WO | WO2006/077812 | 7/2006 |
| WO | WO 2007/091727 A1 | 8/2007 |

OTHER PUBLICATIONS

United States Official Office Action dated Mar. 29, 2011, issued in U.S. Appl. No. 12/457,106, 17 pages total.

United States Official Office Action dated Apr. 11, 2011, issued in U.S. Appl. No. 12/670,601, 12 pages total.

* cited by examiner

WEAK PHASE
(WITHOUT HYDRAULIC PRESSURE SUPPLY)

MOTOR ROTATION DIRECTION

STRONG PHASE
(WITH HYDRAULIC PRESSURE SUPPLY)

MOTOR ROTATION DIRECTION

PHASE CHANGE DIRECTION

MOTOR AND MOTOR CONTROL DEVICE

CROSS-REFERENCE TO RELATED APPLICATION

This application is a National Stage entry of International Application No. PCT/JP2007/056003, filed Mar. 23, 2007, and which claims priority from Japanese Patent Application 2006-157006, filed Jun. 6, 2006 and Japanese Patent Application 2006-259543, filed Sep. 25, 2006. The disclosures of these prior applications are hereby incorporated herein in their entirety by reference.

TECHNICAL FIELD

The present invention relates to a motor and a motor control device. Priority is claimed on Japanese Patent Application No. 2006-157066, filed Jun. 6, 2006, and Japanese Patent Application No. 2006-259543, filed Sep. 25, 2006, the contents of which are incorporated herein by reference.

BACKGROUND ART

Conventionally, there has been known, for example, an axial gap type permanent magnet power generator that is provided with a pair of stators arranged so as to oppose each other from both sides of a rotor in a rotational axis direction, and that forms a magnetic flux loop, via the pair of stators, with respect to the magnetic field magnetic flux due to permanent magnets of the rotor (for example, refer to Patent Document 1).
[Patent Document 1] Published Japanese Translation No. H06-500457 of a PCT Publication

DISCLOSURE OF INVENTION

[Problems to be Solved by the Invention]
Incidentally, in a permanent magnet power generator according to an example of the above mentioned conventional technique, the magnetic field magnetic flux due to the permanent magnets of the rotor linearly passes the rotor so as to sweep between a pair of stators, to thereby reduce the amount of magnetic flux leakage within the rotor and increase the amount of interlinked magnetic flux interlinked with the stator windings of the stators. Moreover there is a demand, in such a permanent magnet power generator, for increasing the amount of interlinked magnetic flux interlinked with the stator windings of the stators to thereby increase the torque potential.

The present invention takes the above circumstances into consideration, with an object of providing a motor and a motor control device, that with effective use of the magnetic field magnetic flux due to permanent magnets of a rotor, is capable of increasing the amount of interlinked magnetic flux interlinked with the stator windings of the stators.
[Means for Solving the Problems]
In order to resolve the above problems and achieve the related object, a motor according to a first aspect of the present invention is provided with: a rotor capable of rotating about a rotational axis; and a first stator and a second stator that are arranged opposed to each other in the rotational axis direction so as to sandwich the rotor from both sides thereof in the rotational axis direction, wherein the rotor is provided with: a plurality of main permanent magnets arranged in the circumferential direction, with the magnetization direction thereof parallel with the rotational axis direction; and a first sub permanent magnet and a second sub permanent magnet arranged in the proximity of both end sections in the rotational axis direction of the main permanent magnet, with the magnetization direction thereof parallel with a direction orthogonal to the rotational axis direction and the radial direction.

Furthermore, in a motor according to a second aspect of the present invention, among two pairs of the first sub permanent magnet and the second sub permanent magnet, one pair of the first sub permanent magnet and the second sub permanent magnet is arranged in the proximity of an end section on one side in the circumferential direction of the main permanent magnet, and the other pair of the first sub permanent magnet and the second sub permanent magnet is arranged in the proximity of the end section on the other side in the circumferential direction of the main permanent magnet.

Moreover, in a motor according to a third aspect of the present invention, the rotor is provided with: a first sub permanent magnet mounting layer having the first sub permanent magnets mounted thereon; a main permanent magnet mounting layer that is laminated, in the rotational axis direction, on the first sub permanent magnet mounting layer and that has the main permanent magnets mounted thereon; and a second sub permanent magnet mounting layer that is laminated, in the rotational axis direction, on the main permanent magnet mounting layer and that has the second sub permanent magnets mounted thereon, and there is provided a phase change device that, by turning at least either one of the first sub permanent magnet mounting layer and the second sub permanent magnet mounting layer, and the main permanent magnet mounting layer about the rotational axis, changes the relative phase between the first sub permanent magnet mounting layer and the second sub permanent magnet mounting layer, and the main permanent magnet mounting layer.

Furthermore, in a motor according to a fourth aspect of the present invention, the phase change device is provided with: a fluid supply device that supplies a fluid; pressure chambers that are provided on the rotational axis of the rotor and that receive a supply of the fluid from the fluid supply device; and a vane rotor that is integrated at least with either one of the first sub permanent magnet mounting layer and the second sub permanent magnet mounting layer, and the main permanent magnet mounting layer, and that is arranged within the pressure chambers so as to turn, with the pressure of the fluid, about the rotational axis.

Moreover, in a motor according to a fifth aspect of the present invention, the phase change device is provided with: a supporting member that, according to the magnetic force between the main permanent magnets, and the first sub permanent magnets and the second sub permanent magnets, and according to the rotational driving force of the main permanent magnet mounting layer, supports the main permanent magnet mounting layer while allowing it to rotate relatively with respect to the first sub permanent magnet mounting layer and the second sub permanent magnet mounting layer; and a regulating device that regulates turning of the main permanent magnet mounting layer relative to the first sub permanent magnet mounting layer and the second sub permanent magnet mounting layer.

Furthermore, in a motor according to a sixth aspect of the present invention, there is provided a connection section that integrally connects the first sub permanent magnet mounting layer and the second sub permanent magnet mounting layer, and the phase change device is provided with: a planetary gear mechanism having a first ring gear that is formed so as to be integrated with and concentric with the main permanent magnet mounting layer, a second ring gear that is formed so as to be integrated with and concentric with either one of the first sub permanent magnet mounting layer and the second sub permanent magnet mounting layer, a first planetary gear that meshes with the first ring gear, a second planetary gear that meshes with the second ring gear, a sun gear that meshes with the first planetary gear and the second planetary gear, and a planetary carrier that rotatably supports either one of the first planetary gear and the second planetary gear and that is capable of turning about the rotational axis; and a turning device that is connected to the planetary carrier and that turns the planetary carrier about the rotational axis only by a predetermined turning amount.

Moreover, a motor according to a seventh aspect of the present invention is provided with: a stator; and a second planetary carrier that rotatably supports the other of either the first planetary gear or the second planetary gear and that is fixed on the stator.

Furthermore, in a motor according to an eighth aspect of the present invention, the turning device is an actuator that hydraulically or electrically turns the planetary carrier, or that regulates the turning.

Moreover, in a motor according to a ninth aspect of the present invention, the predetermined turning amount is a mechanical angle of $\theta$ (°)=(180/p)×g/(1+g) based on a pole pair number p of the motor and a gear ratio g of the sun gear with respect to either one of the first ring gear and the second ring gear.

Furthermore, in a motor according to a tenth aspect of the present invention, the main permanent magnet has a relatively higher residual magnetic flux density compared to at least either one of the first sub permanent magnet and the second sub permanent magnet.

Moreover, in a motor according to an eleventh aspect of the present invention, the main permanent magnet has a relatively greater magnet gross amount compared to at least either one of the first sub permanent magnet and the second sub permanent magnet.

Furthermore, in a motor according to a twelfth aspect of the present invention, at least either one of the first sub permanent magnet and the second sub permanent magnet has a relatively higher level of coercive force compared to the main permanent magnet.

Moreover, a motor control device according to a thirteenth aspect of the present invention is provided with: a motor according to any one of the first aspect through to the twelfth aspect; a power storage device that is connected to the first stator and the second stator, and that supplies and receives electric energy to and from the motor; and a single inverter device that controls supplying/receiving of electric energy between the motor and the power storage device.

[Effects of the Invention]

According to the motor of the first aspect of the present invention, in the proximity of both of the end sections of the main permanent magnet in the rotational axis direction (that is, positions at both of the end sections of the main permanent magnet in the rotational axis direction, or positions spaced at a predetermined distance from both of the end sections of the main permanent magnet in the rotational axis direction), there are provided the first sub permanent magnet and the second sub permanent magnet that are magnetized in a direction orthogonal to the magnetization direction of the main permanent magnet, and it is thereby possible to converge magnetic fluxes of the respective permanent magnets with the magnetic flux lens effect due to the so-called Halback array of permanent magnets, or to generate a magnetic path short circuit with the respective permanent magnets. Thus, in a state where magnetic fluxes converge, it is possible to increase the amount of magnetic fluxes interlinked with the stator windings of the respective stators, and in a state where a magnetic path short circuit is generated, it is possible to suppress demagnetization of the respective permanent magnets.

Furthermore, according to the motor of the second aspect of the present invention, for example, by arranging one set of the first sub permanent magnet and the second sub permanent magnet and the other set of first sub permanent magnet and the second sub permanent magnet so that the magnetization directions thereof become symmetric, it is possible to further effectively generate a magnetic flux convergence caused by the magnetic flux lens effect due to the so-called Halback array of permanent magnets, or a magnetic path short circuit caused by the respective permanent magnets.

Moreover, according to the motor of the third aspect of the present invention, by changing, with the phase change device, the relative phase between the first sub permanent magnet mounting layer and the second sub permanent magnet mounting layer, and the main permanent magnet mounting layer, the state of the motor can be set to an appropriate magnetic field state between: a strong magnetic field state where the magnetic flux lens effect due to the so-called Halback array of permanent magnets causes the magnetic fluxes to converge; and a weak magnetic field state where a magnetic path short circuit is generated by the respective permanent magnets, and by having the magnetic field fluxes due to the respective permanent magnets increase or reduce the amount of interlinked magnetic fluxes interlined with the stator windings, the induced voltage constant can be variably changed. Consequently, the rotational speed range and torque range, within which the motor can be operated, are increased, and thereby the operation efficiency can be improved while the possible operation range can be increased at a high level of efficiency.

Furthermore, according to the motor of the fourth aspect of the present invention, as a result of making the phase change device as a vane actuator including the pressure chambers into which fluid pressure is to be supplied, and the vane rotor arranged inside the pressure chamber and that receives the fluid pressure to rotate, then by controlling the amount of the operating fluid to be supplied to the pressure chambers, the relative phase between the first sub permanent magnet mounting layer and the second sub permanent magnet mounting layer, and the main permanent magnet mounting layer can be changed to a desired phase, while suppressing complexity of the configuration of the motor, and allowing easy and appropriate variable changes in the induced voltage constant.

Moreover, according to the motor of the fifth aspect of the present invention, for example, by pre-setting the rotational driving force that opposes the magnetic force between the main permanent magnet, and the first sub permanent magnet and the second sub permanent magnet to act on the main permanent magnet mounting layer, it is possible to turn, along the direction of the magnetic force action or the direction of the rotational driving force action, the main permanent magnet mounting layer in a direction relatively different to that of the first sub permanent magnet mounting layer and the second sub permanent magnet mounting layer. Consequently, it is possible to change the relative phase between the first sub permanent magnet mounting layer and the second sub permanent magnet mounting layer, and the main permanent magnet mounting layer to a desired phase, while suppressing complexity of the configuration of the motor, and allowing easy and appropriate variable changes in the induced voltage constant.

Furthermore, according to the motor of the sixth aspect of the present invention, the first planetary gear and the second planetary gear are capable of rotating about the respective planetary rotational axis, and meshing with the sun gear that serves as an idle gear. As a result, even in a state where a synchronous operation of the main permanent magnet mounting layer, and the first sub permanent magnet mounting layer and the second sub permanent magnet mounting layer are being executed, or in a state where the motor is being stopped, it is possible to easily change the relative phase between the main permanent magnet mounting layer, and the first sub permanent magnet mounting layer and the second sub permanent magnet mounting layer.

Moreover, since friction in the sun gear can be reduced, a force required for regulating turning of the planetary carrier about the rotational axis (that is, for maintaining at a predetermined turning position), or a force required for turning-driving, regardless of the level of the rotation velocity or torque of the motor, only needs to be greater than the attractive force or repulsive force between the main permanent magnet, and the first sub permanent magnet and the second sub permanent magnet. For example, unlike a brake actuator, it does not require a force greater than the torque that the motor outputs, and enables an efficient phase control.

Furthermore, according to the motor of the seventh aspect of the present invention, since the second planetary carrier is fixed on the stator, when the planetary carrier that supports either one of the first planetary gear and the second planetary gear turns about the rotational axis, the other of either the first planetary gear or the second planetary gear rotates about each planetary rotational axis. Thus, either one of the main permanent magnet mounting layer, and the first sub permanent magnet mounting layer and the second sub permanent magnet mounting layer turns, relatively to the other of either one, about the rotational axis, and it is thereby possible to easily and appropriately change the relative phase between the main permanent magnet mounting layer, and the first sub permanent magnet mounting layer and the second sub permanent magnet mounting layer.

Moreover, according to the motor of the eighth aspect of the present invention, the turning device is an actuator provided, for example, with a hydraulic pump, electric motor, or the like, and it hydraulically or electrically turns the planetary carrier about the rotational axis only by a predetermined turning amount and holds the planetary carrier, against the attractive force or repulsive force between the permanent magnets of the main permanent magnet mounting layer, and the first sub permanent magnet mounting layer and the second sub permanent magnet mounting layer, at a predetermined turning position about the rotational axis.

Furthermore, according to the motor of the ninth aspect of the present invention, the predetermined turning amount when the planetary carrier that supports either one of the first planetary gear and the second planetary gear turns about the rotational axis, is set to a mechanical angle of $\theta$ (°)=(180/p)× g/(1+g), and the state of the motor can be thereby appropriately shifted between a strong magnetic field state and a weak magnetic field state for example.

Moreover, according to the motor of the tenth aspect of the present invention, by relatively increasing the residual magnetic flux density of the main permanent magnet with respect at least to the first sub permanent magnet or the second sub permanent magnet, it is possible to increase the amount of magnetic fluxes interlinked with the stator windings.

Furthermore, according to the motor of the eleventh aspect of the present invention, by relatively increasing the magnet gross amount of the main permanent magnet with respect at least to the first sub permanent magnet or the second sub permanent magnet, the induced voltage of the motor in a weak magnetic field state has the positively/negativity thereof reversed with respect to the induced voltage of the motor in a strong magnetic field state. Thus, it is possible to set the induced voltage constant of the motor to an appropriate value between a positive value and a negative value, while effectively increasing the variable ratio of the induced voltage constant.

Moreover, according to the motor of the twelfth aspect of the present invention, by relatively increasing the coercive force of at least the first sub permanent magnet or the second sub permanent magnet with respect to the main permanent magnet, it is possible to suppress demagnetization caused by the magnetic field from the stators in the first sub permanent magnet or the second sub permanent magnet, the magnetic field of which from the stators is likely to become a relatively demagnetizing field compared to the main permanent magnet.

Furthermore, according to the motor control device of the thirteenth aspect of the present invention, since the single inverter device controls electric power application to the first stator and the second stator, it is possible to suppress complexity of the configuration of the device while allowing easy and appropriate variable changes in the induced voltage constant of the motor.

DESCRIPTION OF THE REFERENCE SYMBOLS

Figure 1:
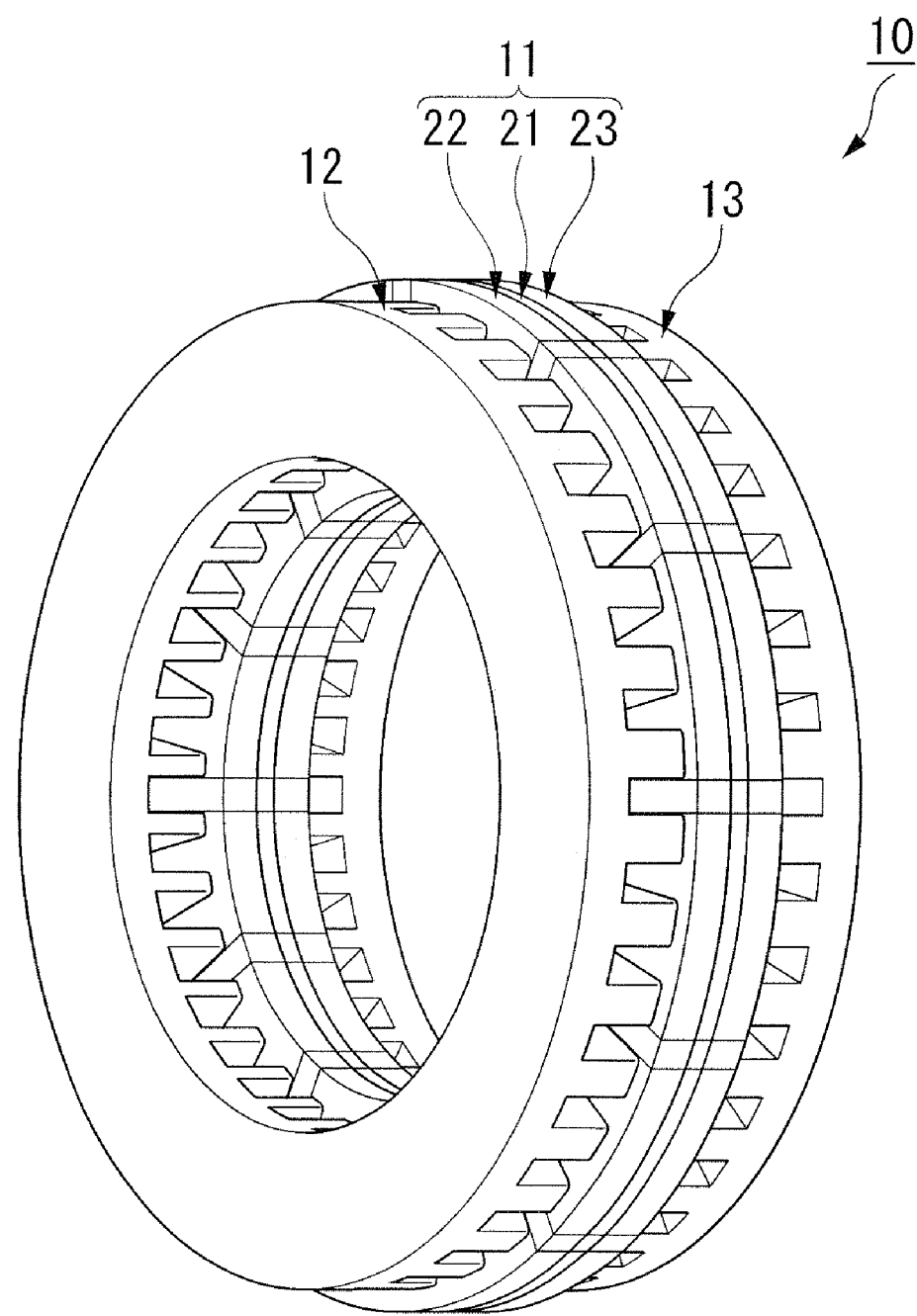
FIG. 1 is a perspective view of a relevant section of a motor according to an embodiment of the present invention.

10 Motor
11 Rotor
11a Connection section
12 First stator (stator)
13 Second stator (stator)
21 Main permanent magnet mounting layer
21a Main permanent magnet
22 First sub permanent magnet mounting layer
22a First sub permanent magnet
23 Second sub permanent magnet mounting layer
23a Second sub permanent magnet
25 Phase change mechanism (phase change device)
25a Hydraulic control device (fluid supply device)
31 First drive plate (supporting member)
32 Second drive plate (supporting member)
33 Vane rotor
42 Projecting section (regulating device)
52 Second pressure chamber (pressure chamber)
60 Motor control device
61 Inverter circuit (inverter device)
63 Battery (power storage device)
80 Planetary gear mechanism
81 First ring gear (R1)
82 Second ring gear (R2)
83 First planetary gear train (first planetary gear)
84 Second planetary gear train (second planetary gear)
85 Sun gear (S)
86 First planetary carrier (C1) (planetary carrier)
87 Second planetary carrier (C2) (second planetary carrier)
90 Actuator (turning device)

BEST MODE FOR CARRYING OUT THE INVENTION

Hereunder, an embodiment of a motor and a motor control device of the present invention are described, with reference to the accompanying drawings.

Figure 2:
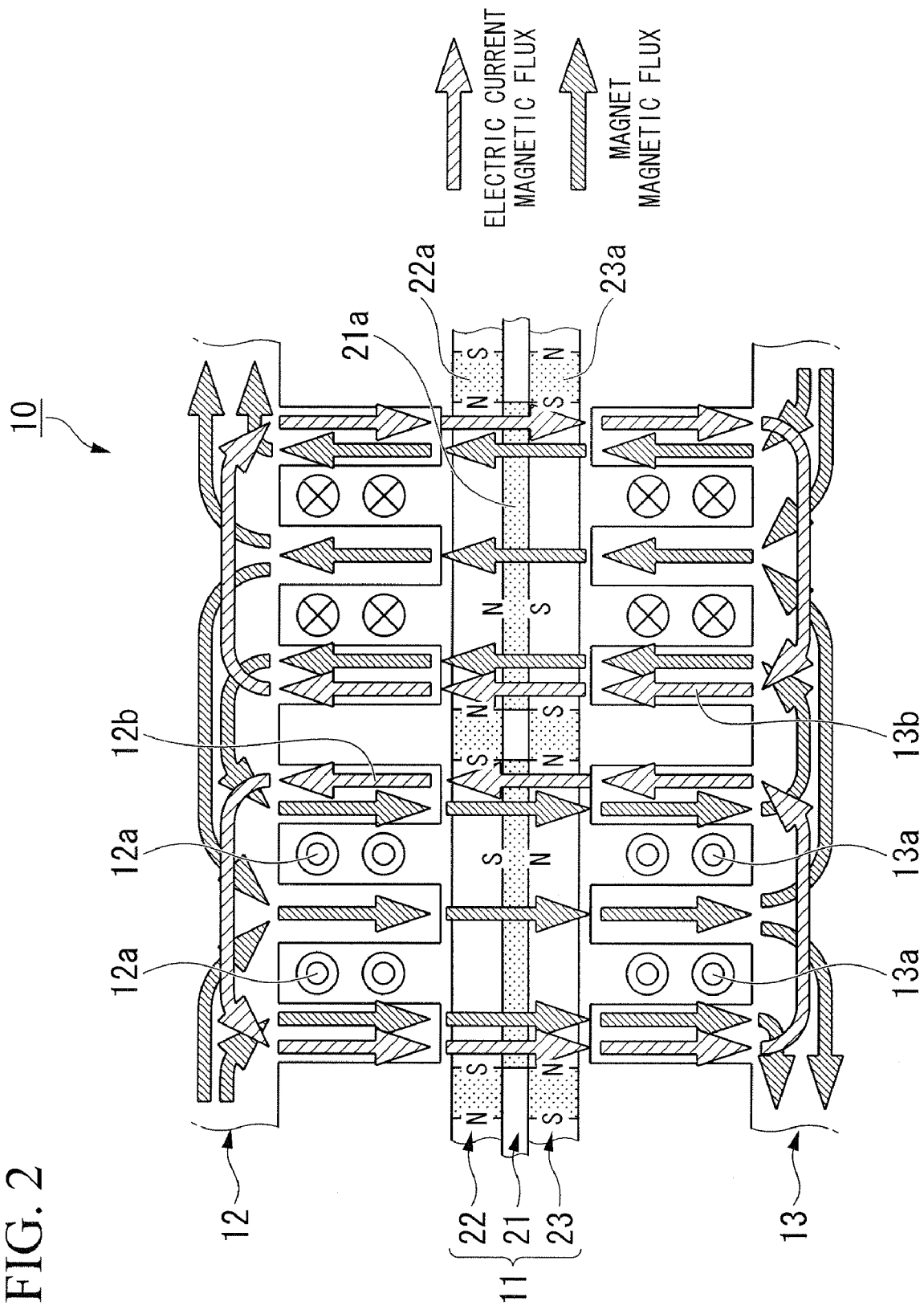
FIG. 2 is a drawing of the relevant section of the motor according to the embodiment of the present invention seen from the outer circumference side towards the inner circumference side.

A motor 10 according to the present embodiment, for example, as shown in FIG. 1 and FIG. 2, is an axial gap type motor provided with: a substantially disc shaped rotor 11 provided so as to be rotatable about the rotational axis of this motor 10; and a first stator 12 and a second stator 13 that are arranged so as to oppose to each other across both sides of the rotor 11 in the rotational axis direction and that have respective stator windings 12a and 13a having a plurality of phases for generating a rotational magnetic field for rotating the rotor 11.

This motor 10, for example, is installed as a driving source on a vehicle such as a hybrid vehicle or an electric vehicle, and the output shaft thereof (rotation shaft) is connected to the input shaft of a transmission (not shown in the drawing) to thereby transmit the driving force of the motor 10 to the driving wheels of a vehicle (not shown in the drawing) via a transmission.

Moreover, if a driving force is transmitted from the driving wheel side to the motor 10 when the vehicle is slowing down, then the motor 10 functions as a power generator to generate a so-called regenerative braking force and recovers kinetic energy of the vehicle body as electric energy (regenerative energy). Furthermore, in a hybrid vehicle for example, if the rotation shaft of the motor 10 is connected to the crank shaft of an internal combustion engine (not shown in the drawing), then also in the case where output of the internal combustion engine is transmitted to the motor 10, the motor 10 functions as a power generator and generates electrical energy.

The rotor 11, as shown in FIG. 2 for example, is provided with: a main permanent magnet mounting layer 21 having a plurality of main permanent magnets 21a mounted thereon; a first sub permanent magnet mounting layer 22 having a plurality of first sub permanent magnets 22a mounted thereon; a second sub permanent magnet mounting layer 23 having a plurality of second sub permanent magnets 23a mounted thereon; and a phase change mechanism 25 capable of changing the relative phase between the first sub permanent magnet mounting layer 22 and the second sub permanent magnet mounting layer 23, and the main permanent magnet mounting layer 21, by turning, about the rotational axis, at least either the first sub permanent magnet mounting layer 22 and the second sub permanent magnet mounting layer 23, or the main permanent magnet mounting layer 23, for example, by turning the first sub permanent magnet mounting layer 22 and the second sub permanent magnet mounting layer 23, wherein the first sub permanent magnet mounting layer 22, the main permanent magnet mounting layer 21, and the second sub permanent magnet mounting layer 23 are arranged so as to be concentrically and sequentially laminated along the rotational axis direction.

Figure 3A:
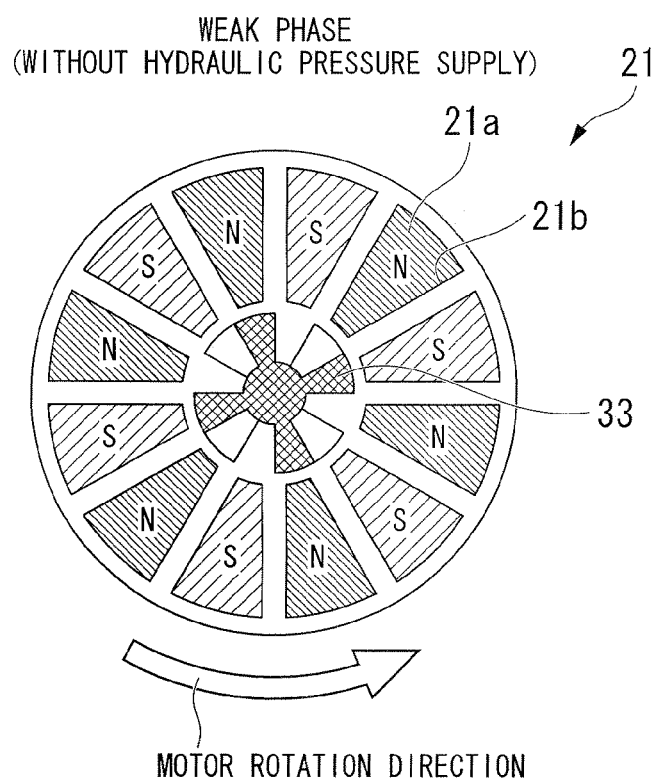
FIG. 3A is a plan view of a main permanent magnet mounting layer of a rotor of the motor according to the embodiment of the present invention in a weak magnetic field state, seen from the rotational axis direction.
Figure 3B:
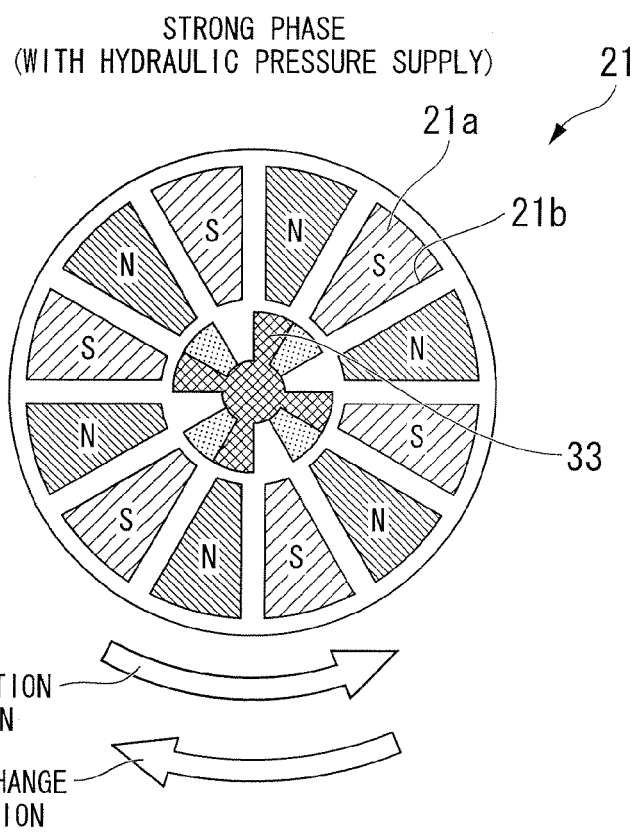
FIG. 3B is a plan view of the main permanent magnet mounting layer of the rotor of the motor according to the embodiment of the present invention in a strong magnetic field state, seen from the rotational axis direction.

The main permanent magnet mounting layer 21, as shown in FIG. 3A and FIG. 3B for example, is formed in a disk shape, and has a plurality of (for example, twelve) magnet mounting holes 21b passing therethrough in the thickness direction (that is, the rotational axis direction) formed therein at predetermined intervals around the circumferential direction. In each of the magnet mounting holes 21b, there is, for example, mounted the substantially fan-plate-shaped main permanent magnet 21a.

Each of the main permanent magnets 21a is magnetized in the thickness direction (that is, the rotational axis direction), and two of these main permanent magnets 21a mounted in the magnet mounting holes 21b adjacent to each other in the circumferential direction are set so that the magnetic directions thereof are in mutually different directions. That is to say, adjacent to, in the circumferential direction, the magnet mounting hole 21b having the main permanent magnet 21a with its north pole on one side in the rotational axis direction mounted therein, there is arranged the magnet mounting hole 21b having the main permanent magnet 21a with its south pole on one side in the rotational axis direction mounted therein.

Figure 4A:
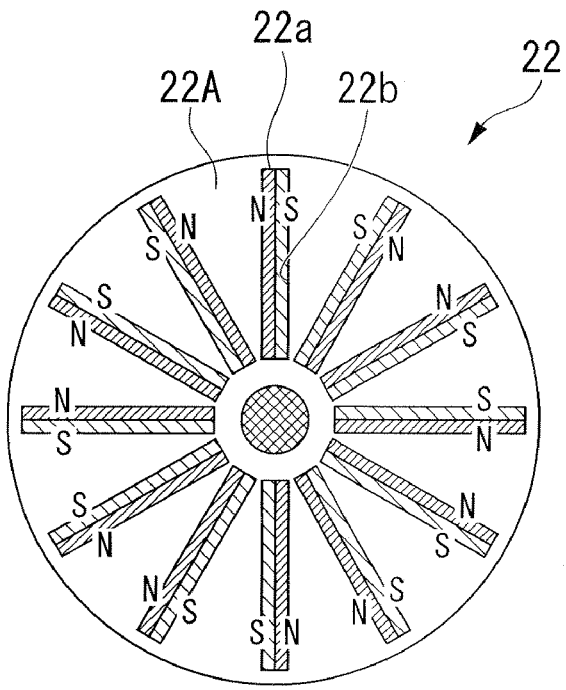
FIG. 4A is a plan view of a first sub permanent magnet mounting layer of the rotor of the motor according to the embodiment of the present invention seen from the rotational axis direction.
Figure 4B:
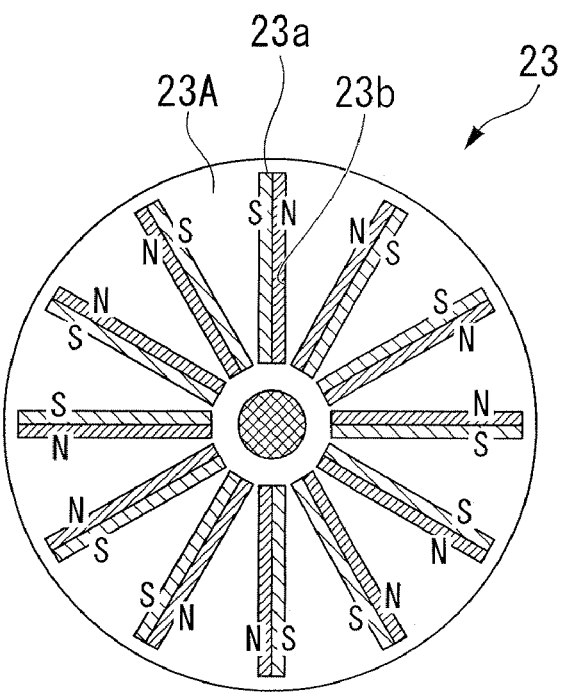
FIG. 4B is a plan view of a second sub permanent magnet mounting layer of the rotor of the motor according to the embodiment of the present invention seen from the rotational axis direction.

The first sub permanent magnet mounting layer 22 and the second sub permanent magnet mounting layer 23 positioned on both sides of the main permanent magnet mounting layer 21 in the rotational axis direction, as shown in FIG. 4A and FIG. 4B for example, are formed in a disk shape, and on each of the surfaces 22A and 23A of each of the sub permanent magnet mounting layers 22 and 23 on the rotational axis direction outer side, there are, for example, formed a plurality of magnet mounting grooves 22b and 23b that radially extend outward from the rotational axis in a radial direction. In the respective magnet mounting grooves 22b and 23b, there are, for example, respectively mounted the substantially rectangular plate shaped sub permanent magnets 22a and 23a so as to project outward from the respective surfaces 22A and 23A in the rotational axis direction.

The respective permanent magnets 22a and 23a are magnetized in the thickness direction (that is, in the direction orthogonal to the rotational axis direction and the radial direction), and for example, two of the first sub permanent magnets mounted in the first sub permanent magnet mounting grooves 22b adjacent to each other in the circumferential direction are set so that the magnetic directions thereof are in mutually different directions. Similarly, for example, two of the second sub permanent magnets 23a mounted in the second sub permanent magnet mounting grooves 23b adjacent to each other in the circumferential direction are set so that the magnetic directions thereof are in mutually different directions.

That is to say, adjacent to, in the circumferential direction, the first sub permanent magnet mounting groove 22b having the first sub permanent magnet 22a with its north pole on one side in the circumferential direction mounted therein, there is arranged the first sub permanent magnet mounting groove 22b having the first sub permanent magnet 22a with its south pole on one side in the circumferential direction mounted therein. Similarly, adjacent to, in the circumferential direction, the second sub permanent magnet mounting groove 23b having the second sub permanent magnet 23a with its north pole on one side in the circumferential direction mounted therein, there is arranged the second sub permanent magnet mounting groove 23b having the second sub permanent magnet 23a with its south pole on one side in the circumferential direction mounted therein.

Furthermore, the respective magnet mounting grooves 22b and 23b of the first sub permanent magnet mounting layer 22 and the second sub permanent magnet mounting layer 23 opposing each other in the rotational axis direction are arranged so that they can be arranged mutually opposed to each other in the rotational axis direction.

Moreover when in this state of being arranged opposed to each other, all of the respective first sub permanent magnets 22a are in one-to-one pairs with the respectively corresponding second sub permanent magnets 23a, with their rotational direction phases aligned with each other.

Furthermore, in this state of being arranged opposed to each other, the mutually corresponding first sub permanent magnet 22a and second sub permanent magnet 23a are set so that the magnetic directions thereof are in mutually different directions.

That is to say, opposed to, in the rotational axis direction, the first sub permanent magnet 22a with its north pole on one side in the circumferential direction, there is arranged the second sub permanent magnet 23a with its south pole on one side in the circumferential direction.

Among a plurality of pairs of the first sub permanent magnet 22a and second sub permanent magnet 23a arranged opposed to each other in the rotational axis direction in a state where their magnetic directions are in mutually different directions, two pairs of the respective sub permanent magnets 22a and 23a adjacent to each other in the circumferential direction can be arranged so that they are present on both sides of the main permanent magnet 21a in the circumferential direction.

Figure 5A:
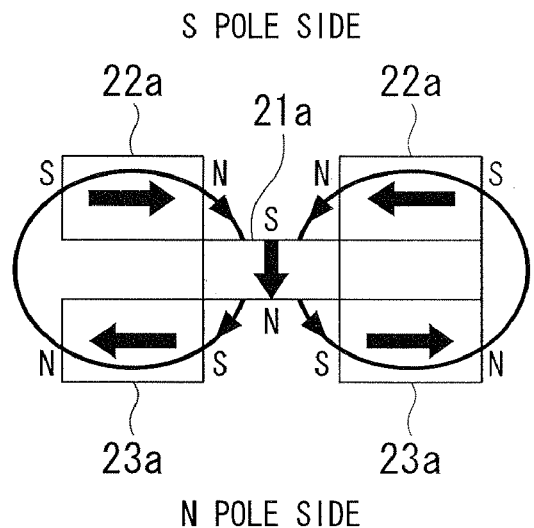
FIG. 5A is a drawing of an arrangement state of a main permanent magnet and first and second sub permanent magnets of the motor according to the embodiment of the present invention in a weak magnetic field state, seen from the radial direction.
Figure 5B:
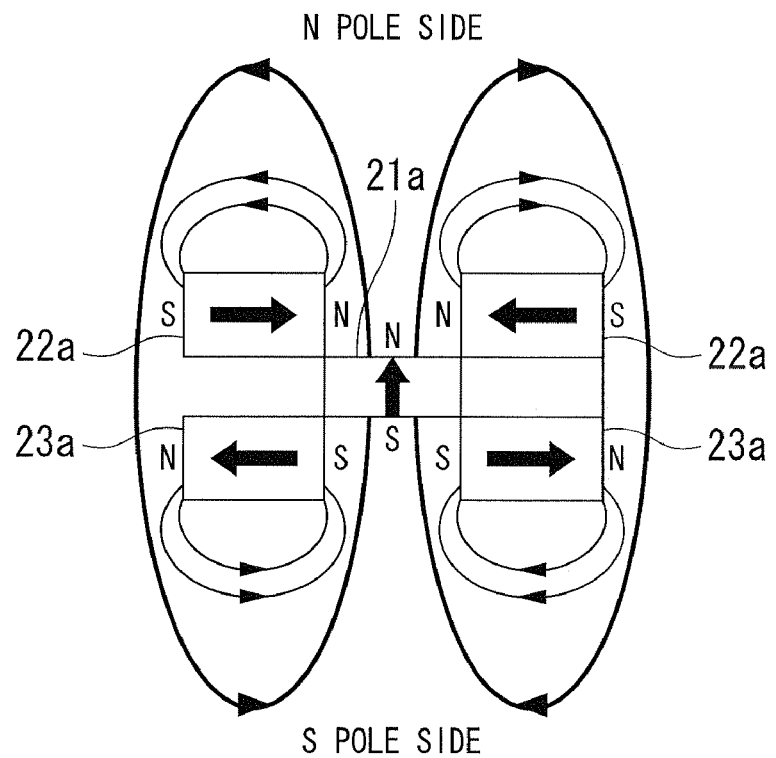
FIG. 5B is a plan view of an arrangement state of the main permanent magnet and first and second sub permanent magnets of the motor according to the embodiment of the present invention in a strong magnetic field state, seen from the radial direction.

Thus, according to the relative position about the rotational axis between the main permanent magnet 21a and the two pairs of the respective sub permanent magnets 22a and 23a adjacent to each other in the circumferential direction, it is possible to set the state of the motor 10 into an appropriate state in a range between: a weak magnetic field state, for example as shown in FIG. 5A, where a magnetic path short circuit occurs between the first sub permanent magnet 22a and the second sub permanent magnet 23a arranged opposed to each other in the rotational direction, and the main permanent magnet 21a, and the effective magnetic flux interlinked with the respective stator windings 12a and 13a relatively decreases; and a strong magnetic field state, for example as shown in FIG. 5B, where the magnetic flux converges with a magnetic flux lens effect due to the so-called Halback array of permanent magnets, and the effective magnetic flux interlinked with the respective stator winding s 12a and 13a relatively increases.

That is to say, in a strong magnetic field state, with respect to the main permanent magnet 21a with its north pole on one side in the rotational axis direction and its south pole on the other side in the rotational axis direction for example, two of the first sub permanent magnets 22a, on one side in the rotational axis direction, present on both sides of this main permanent magnet 21a in the circumferential direction, are arranged so that their north poles are mutually opposed to each other in the circumferential direction, and two of the second sub permanent magnets 23a, on the other side in the rotational axis direction, present on both sides of this main permanent magnet 21a in the circumferential direction, are arranged so that their south poles are mutually opposed to each other in the circumferential direction.

Moreover, in a weak magnetic field state, with respect to the main permanent magnet 21a with its north pole on one side in the rotational axis direction and its south pole on the other side in the rotational axis direction for example, two of the first sub permanent magnets 22a, on one side in the rotational axis direction, present on both sides of this main permanent magnet 21a in the circumferential direction, are arranged so that their south poles are mutually opposed to each other in the circumferential direction, and two of the second sub permanent magnets 23a, on the other side in the rotational axis direction, present on both sides of this main permanent magnet 21a in the circumferential direction, are arranged so that their north poles are mutually opposed to each other in the circumferential direction.

Next, there is described the phase change mechanism 25 that changes, for example with the hydraulic pressure (fluid pressure) of incompressible fluid operating oil (fluid) supplied from the hydraulic control device 25a, relative phases between the first sub permanent magnet mounting layer 22 and second sub permanent magnet mounting layer 23, and the main permanent magnet mounting layer 21.

Figure 6:
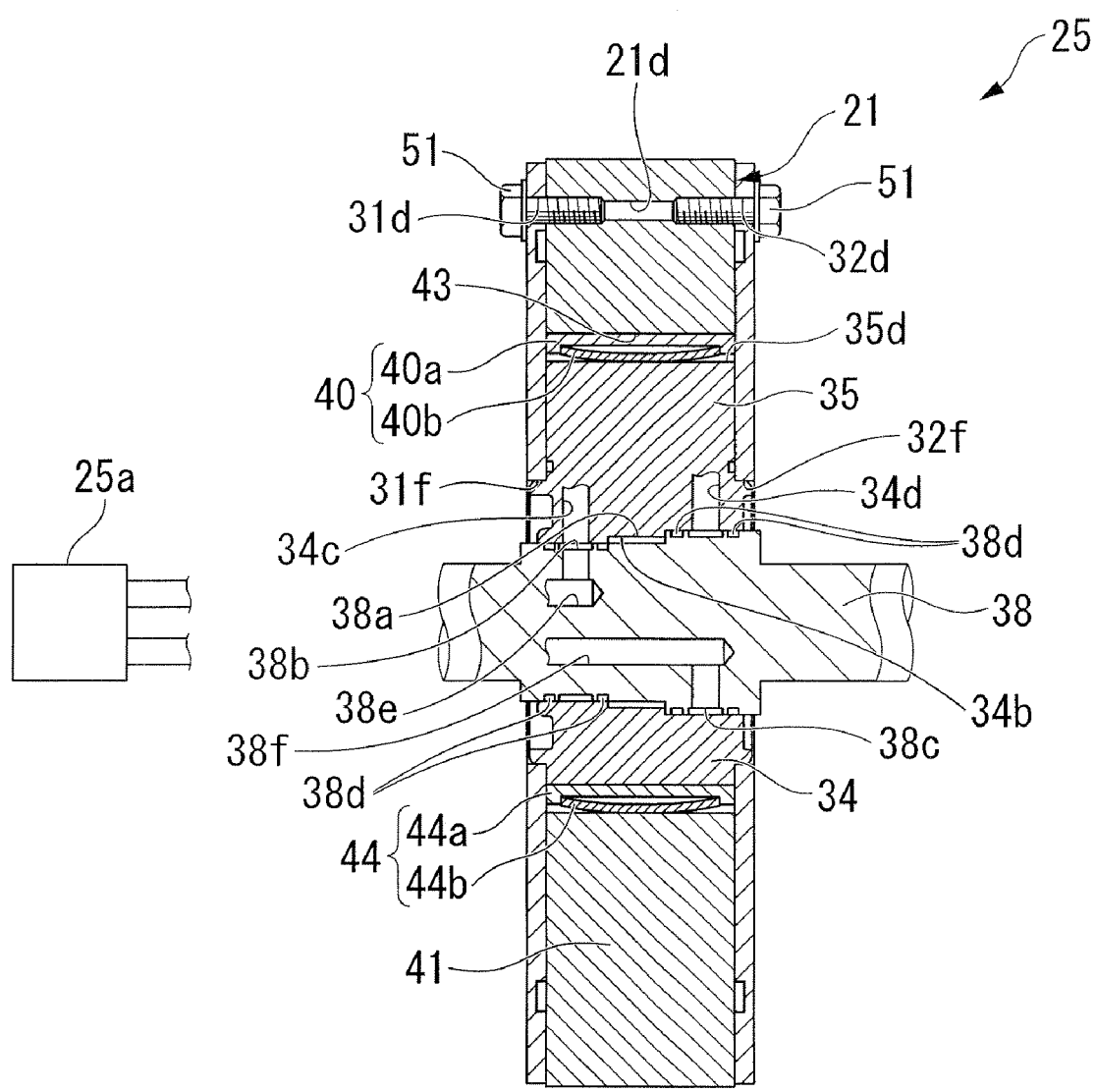
FIG. 6 is a sectional view of a relevant section showing the motor according to the embodiment of the present invention.
Figure 7:
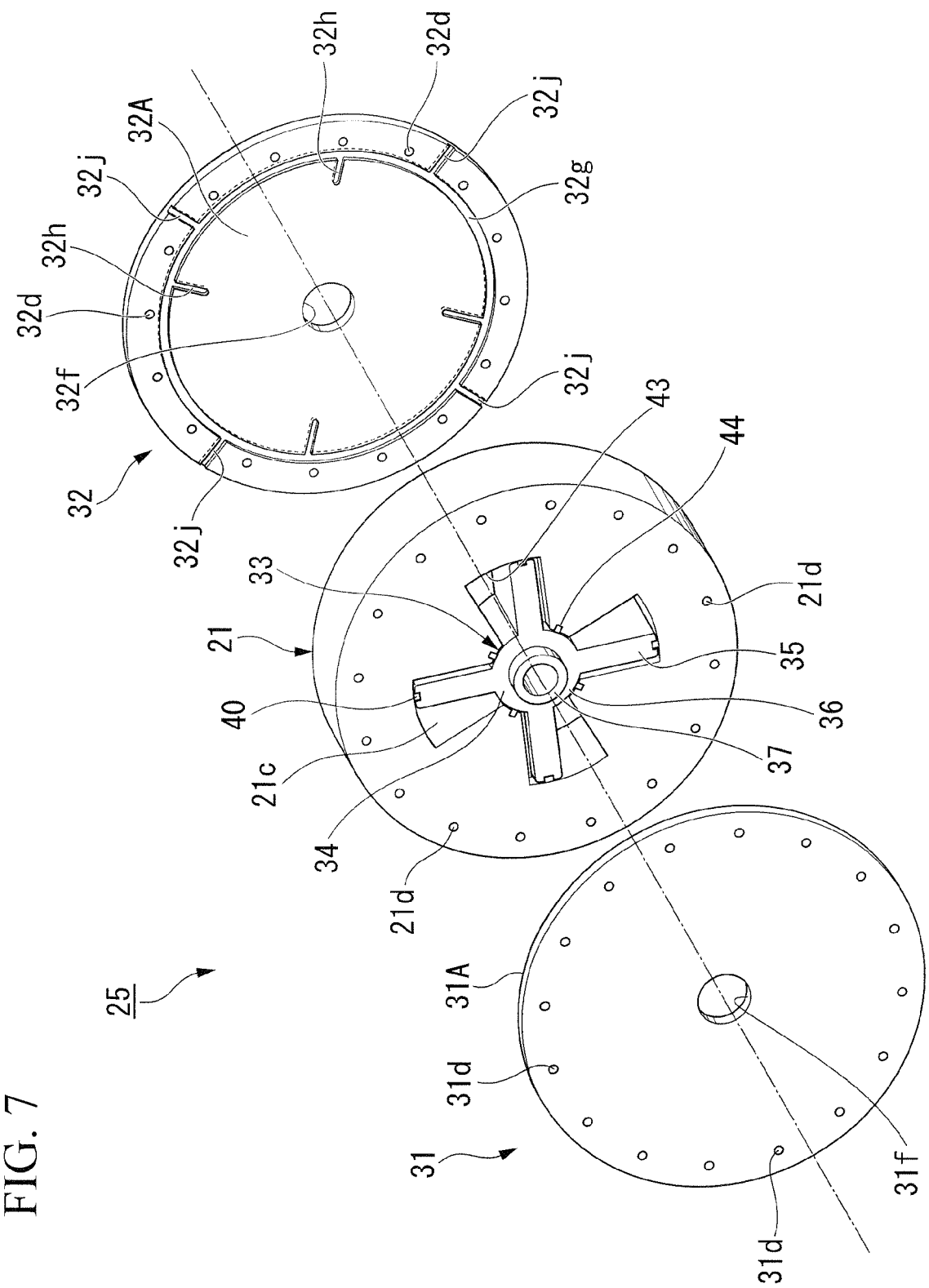
FIG. 7 is an exploded perspective view showing a phase change mechanism of the motor according to the embodiment of the present invention.

This phase change mechanism 25, for example as shown in FIG. 6 and FIG. 7, is provided with: a first drive plate 31 and a second drive plate 32 that are fixed so as to cover, on both sides of the main permanent magnet mounting layer 21 in the rotational axis direction, a hollow section that passes, in the rotational axis direction, through the inner circumference section of the main permanent magnet mounting layer 21; and a vane rotor 33 that is supported by these first and second drive plates 31 and 32 while being able to turn about the rotational axis and that is provided in the hollow section 21c of the main permanent magnet mounting layer 21, and the vane rotor 33, for example, is fixed on the first sub permanent magnet mounting layer 22 and the second sub permanent magnet mounting layer 23.

On the outer circumferential section of the main permanent magnet mounting layer 21 there is provided a plurality of screw holes 21d passing therethrough in the rotational axis direction in positions spaced at predetermined intervals in the circumferential direction.

On the outer circumferential section of the first drive plate 31 there is provided a plurality (for example as many as the number of the screw holes 21d in the main permanent magnet mounting layer 21) of bolt insertion holes 31d spaced at equal intervals on the same circumference, and furthermore, in the center position of the first drive plate 31 on the inner circumferential side of the bolt insertion holes 31d, there is provided an engaging hole 31f passing therethrough in the rotational axis direction.

On the outer circumferential section of the second drive plate 32 there is provided a plurality (for example as many as the number of the screw holes 21d in the main permanent magnet mounting layer 21) of bolt insertion holes 32d spaced at equal intervals on the same circumference, and furthermore, in the center position of the second drive plate 32 on the inner circumferential side of the bolt insertion holes 32d, there is provided an engaging hole 32f passing therethrough in the rotational axis direction.

Figure 8:
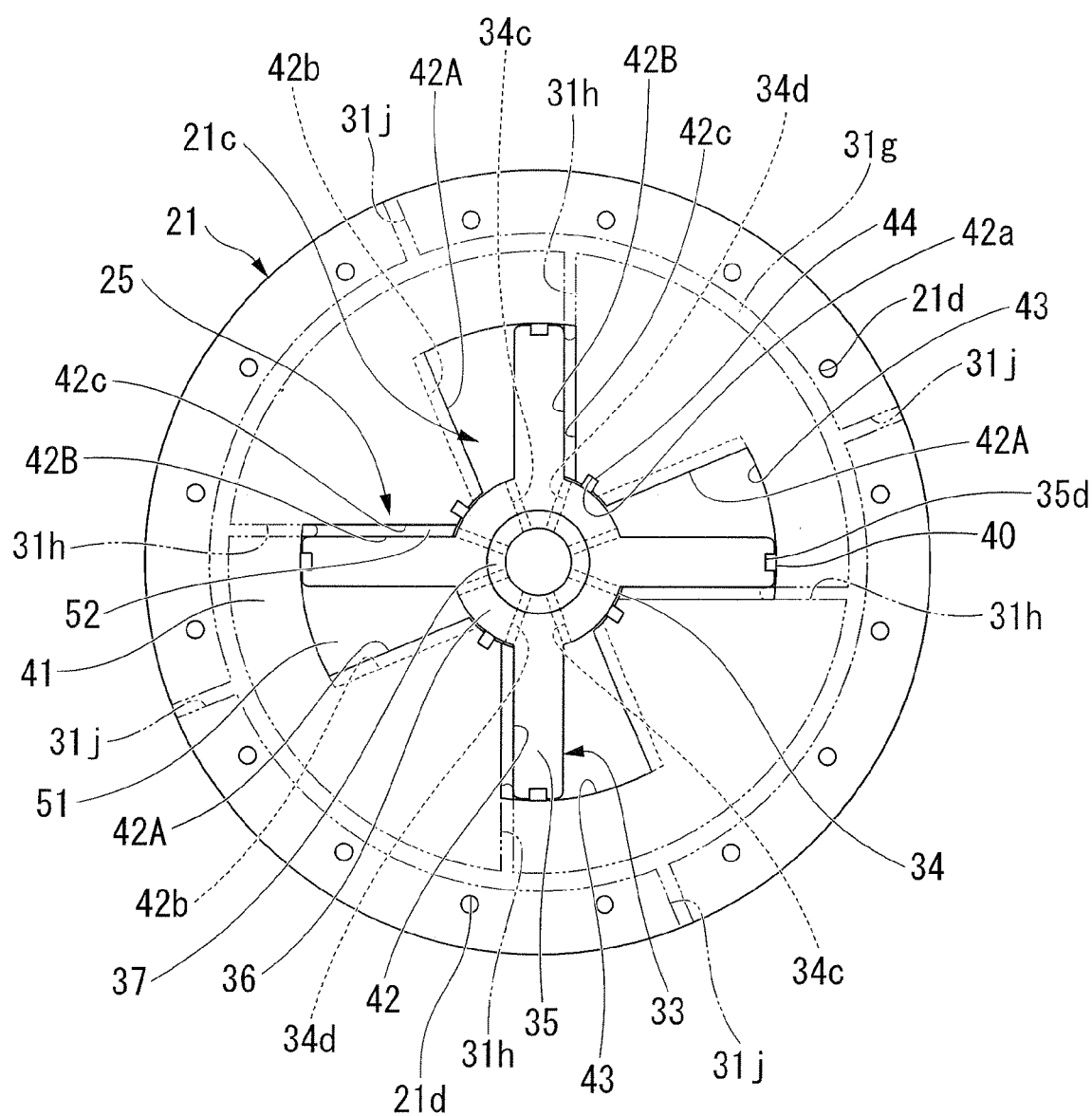
FIG. 8 is a front view showing the main permanent magnet mounting layer and the phase change mechanism of the motor according to the embodiment of the present invention in a weak magnetic field state, wherein a first drive plate on the near side is omitted and a passage groove of the first drive plate on the near side is shown with two-dot chain lines.
Figure 9:
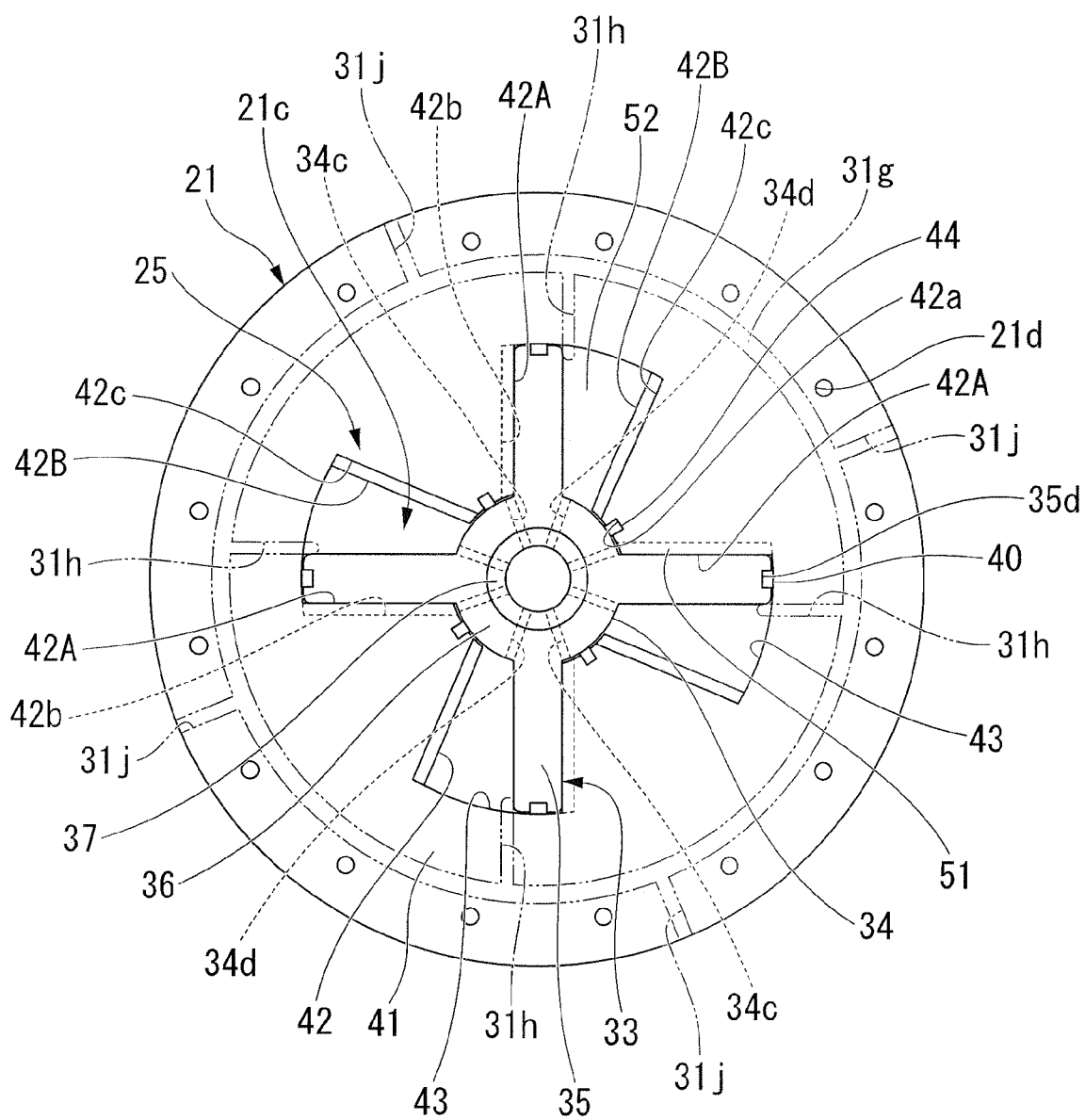
FIG. 9 is a front view showing the main permanent magnet mounting layer and the phase change mechanism of the motor according to the embodiment of the present invention in a strong magnetic field state, wherein the first drive plate on the near side is omitted and the passage groove of the first drive plate on the near side is shown with two-dot chain lines.

For example, as shown in FIG. 7 to FIG. 9, on the front surface 31A on the rotational axis direction inner side of the first drive plate 31, there is, on the inner circumferential side of the bolt insertion holes 31d on the outer circumferential side, formed a passage groove 31g formed in an annular shape concentric with the first drive plate 31, and moreover, for example as shown in FIG. 8 and FIG. 9, from positions on this passage groove 31g at equal intervals in the circumferential direction, there are provided passage grooves 31h extending in equal length towards the axial center side.

These passage grooves 31h are parallel to the radial lines of the quadrisection passing through the center of the first drive plate 31 and the respective bolt insertion holes 31d, and are offset by a predetermined amount on the same side in the circumferential direction. Furthermore, on the surface on one side of the first drive plate 31 in the rotational axis direction, there is provided a plurality of passage grooves 31j that respectively pass through radially outward in a radial pattern, from positions on the passage groove 31g spaced at equal intervals in the circumferential direction, to the outer circumferential surface. The phases of the passage grooves 31h and the passage grooves 31j differ in the circumferential direction.

These passage grooves 31h of the first drive plate 31 are set so as to extend to cavities 43 in the main permanent magnet mounting layer 21 described later.

Figure 10:
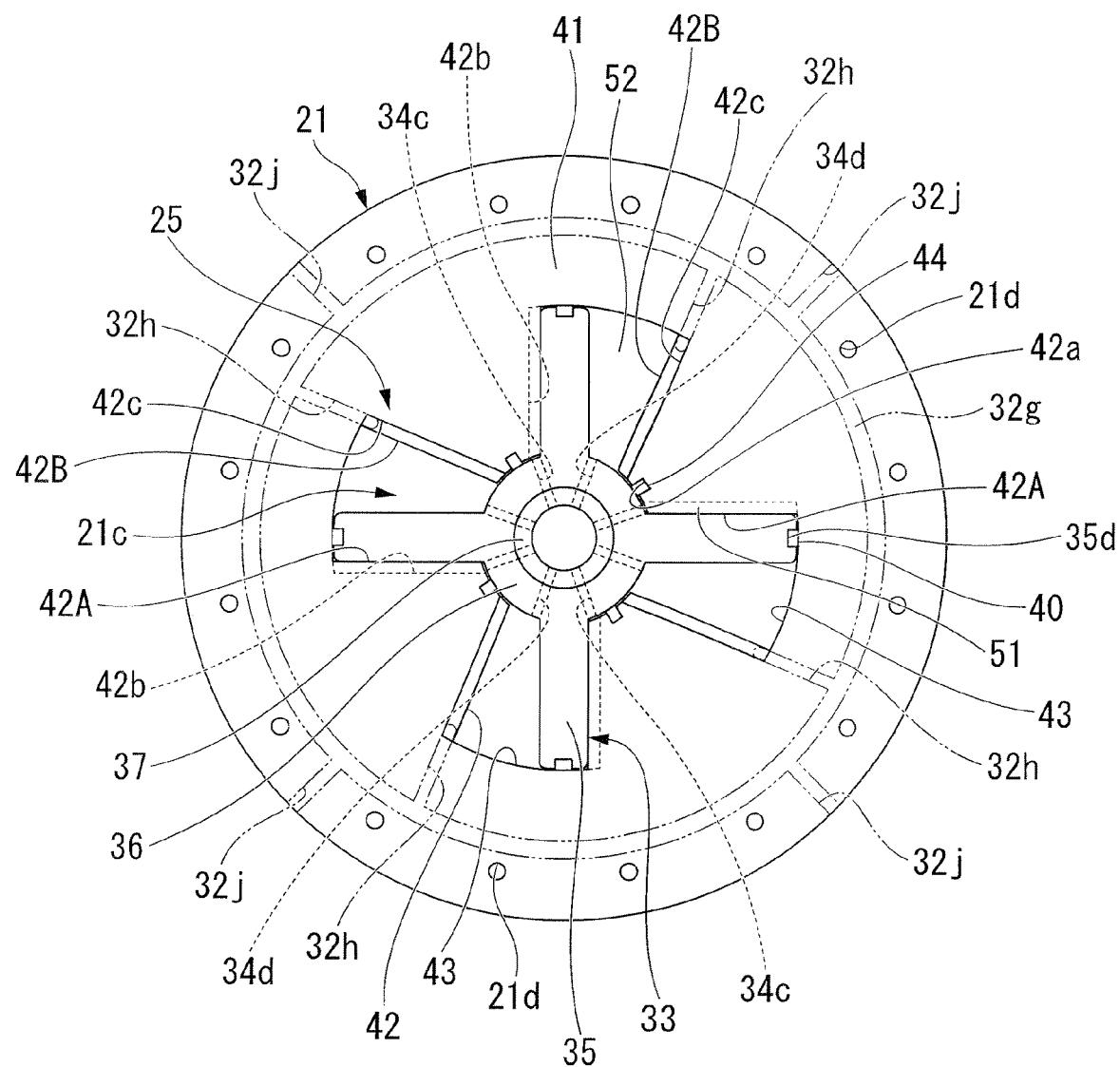
FIG. 10 is a front view showing the main permanent magnet mounting layer and the phase change mechanism of the motor according to the embodiment of the present invention in a strong magnetic field state, wherein the first drive plate on the near side is omitted and the passage groove of a second drive plate on the far side is shown with two-dot chain lines.

For example, as shown in FIG. 7 and FIG. 10, on the front surface 32A on the rotational axis direction inner side of the second drive plate 32, there is, on the inside of the bolt insertion holes 32d on the outer circumferential side, formed an annular passage groove 32g that is concentric with the second drive plate 32 and that has a diameter the same as that of the passage groove 31g of the first drive plate 31, and a plurality of passage grooves 32j pass through radially outward in a radial pattern, from positions on this passage groove 32g spaced at equal intervals in the circumferential direction, to the outer circumferential surface.

The passage grooves 31j of the first drive plate 31 and the passage grooves 32j of the second plate 32 are arranged so that the phases thereof differ in the circumferential direction.

Moreover, as shown in FIG. 7 and FIG. 10 for example, a plurality of passage grooves 32h extend in equal length, from positions on the passage groove 32g spaced at equal intervals in the circumferential direction, towards the axial center.

These passage grooves 32h are parallel to the radial lines of the quadrisection passing through the center of the second drive plate 32 and the respective bolt insertion holes 32d, and are offset by a predetermined amount on the same side in the circumferential direction.

The vane rotor 33 is, as shown in FIG. 7 and FIG. 10 for example, provided with a cylinder shaped boss section 34, and a plurality (as many as the number of the above bolt insertion holes 31e and 32e, for example) of blade sections 35 extending radially outward from positions spaced at equal intervals in the circumferential direction on the outer circumferential surface of the boss section 34.

The boss section 34 is a stepped boss having a sandwiched base section 36 of the same length in the rotational axis direction as the blade sections 35 on the outer circumferential side, and a pair of cylinder-shaped engaging sections 37 protruding in the rotational axis direction on both sides from the inner circumferential side of this sandwiched base section 36. Moreover, on the inner circumferential side of the boss section 34, there is formed, in the rotational axis direction center section thereof, a connecting spline 34b shown in FIG. 6. On both sides in the rotational axis direction of each of the blade sections 35, as shown in FIG. 11, there are, with respectively different positions in the rotational axis direction, formed: respective through passage holes 34c on the same one side in the rotational direction of the base end of the blade section 35 closest to the inner circumferential side at the position of each blade section 35; and respective through passage holes 34d on the same opposite side in the rotational direction of the base end of the blade section 35 closest to the inner circumferential side at the position of each blade section 35.

On the inner circumferential section of this vane rotor 33, there is to be fitted an output shaft 38, to which the driving force of the rotor is transmitted. This output shaft is provided with: a connecting spline 38a joined to the connecting spline 34b of the boss 34; an annular linking groove 38b that links, with the connecting spline 38a, all the passage holes 34c of the boss section 34 in a joined condition; an annular linking groove 38c that links all the passage holes 34d in the same condition; and sealing grooves 38d formed in positions on both outer sides of these respective linking grooves 38b and 38c. In these sealing grooves 38d, there are respectively provided a sealing ring (not shown in the drawing) for sealing the gap with the vane rotor 33. Moreover, in this output shaft 38, there are formed: a passage hole 38e for feeding and discharging operating oil to and from the linking groove 38b through the interior thereof; and a passage hole 38f for feeding and discharging the operating oil to and from the linking groove 38c.

Furthermore, this output shaft 38, with the portions on both sides protruding outward in the rotational axis direction from the respective drive plates 31 and 32, is fixed to the first sub permanent magnet mounting layer 22 and the second sub permanent magnet mounting layer 23.

Figure 11:
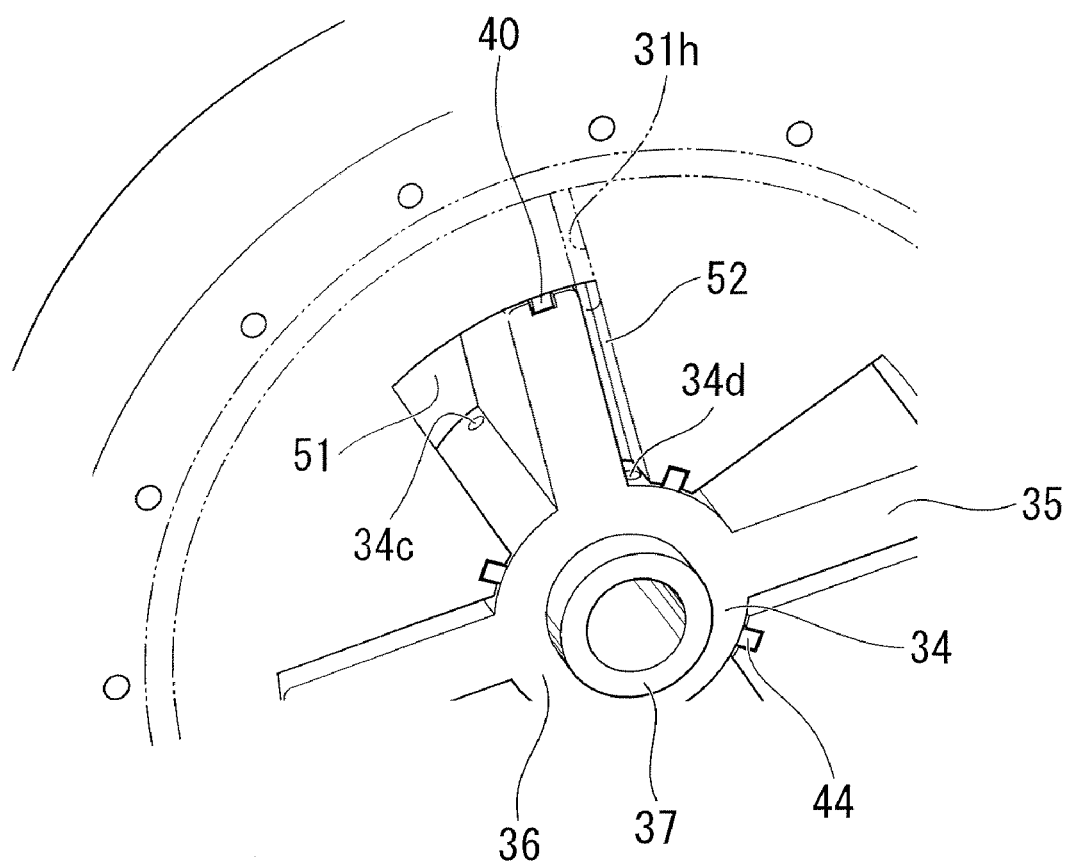
FIG. 11 is a partial perspective view showing the main permanent magnet mounting layer and the phase change mechanism of the motor according to the embodiment of the present invention in a weak magnetic field state, wherein the first drive plate on the near side is omitted and the passage groove of the first drive plate on the near side is shown with two-dot chain lines.

Each of the blade sections 35 is such that, as shown in FIG. 7 through to FIG. 11 for example, on the outer circumferential surface thereof, there is formed, along the entire length thereof in the rotational axis direction, a seal retaining groove 35d concaved towards the center side. In these seal retaining grooves 35d, there is respectively arranged a spring seal 40 for sealing the gap between the main permanent magnet mounting layer 21 and the hollow section 21c. Each of the spring seals 40 is provided with: a seal 40a that is provided on the outer side so as to slide on the hollow section 21c as shown in FIG. 6; and a spring 40b that is provided on the inner side so as to press the seal 40a radially outward towards the hollow section 21c side.

As shown in FIG. 8 through FIG. 10, the inner circumferential section of the main permanent magnet mounting layer 21 is provided with: a ring shaped base section 41; and protruding sections 42 of the same number as the number of the blade sections 35 that protrude radially inward from positions on the inner circumferential surface of the base section 41 spaced at equal intervals in the circumferential direction. Each of the protruding sections 42, when seen in the rotational axis direction, is of a substantially isosceles triangle shape with a tapered tip end, and for all of the protruding sections 42, between the respective protruding sections 42 adjacent to each other in the circumferential direction, there is respectively formed the cavity 43, in which the blade section 35 of the above vane rotor 33 can be arranged. Each of the protruding sections 42 is such that on each inner end surface thereof, there is formed, along the entire length in the rotational axis direction, a seal retaining groove 42a concaved towards the outer diameter side. In these seal retaining grooves 42a, there are respectively arranged a spring seal 44 for sealing the gap with the outer circumferential surface of the boss section 34 of the vane rotor 33. Each of these spring seals 44 is provided with: a seal 44a that slides on the boss section 34 of the vane rotor 33 provided on the inner circumferential side as shown in FIG. 6; and a seal spring 44b that is provided on the outer diameter side so as to press the seal 44a towards the vane rotor 33 side.

Moreover, as shown in FIG. 8 through to FIG. 10, on a wall section 42A, on the same side in the rotational direction, of the main permanent magnet mounting layer 21 of each of the protruding sections 42, there is, in the edge section of the same side in the rotational axis direction of the inner circumferential side rotor 11, respectively formed a notch section 42b extending along the radial direction. Furthermore, on a wall section 42B, on the opposite side in the rotational direction, of each of the protruding sections 42, there is, in the edge section on the side opposite to that mentioned above in the rotational axis direction of the main permanent magnet mounting layer 21, respectively formed a notch section 42c extending along the radial direction.

Thus, the blade sections 35 of the vane rotor 33 are respectively arranged in the cavities 43 in the main permanent magnet mounting layer 21 one by one. Moreover, the output shaft that is spline-joined to the vane rotor 33 can integrally rotate with and specifically, is integrally fixed to the first sub permanent magnet mounting layer 22 and the second sub permanent magnet mounting layer 23.

Here, in a weak magnetic field state, as shown in FIG. 8, all of the blade sections 35, within the corresponding cavities 43, are respectively in contact with the adjacent protruding sections 42 on the above same opposite side in the rotational axis direction, and a second pressure chamber 52 is formed between the blade section 35 and the adjacent protruding sections 42 in contact while a first pressure chamber 51 that is larger than the second pressure chamber 52 is formed between the blade section 35 and the adjacent protruding sections 42 respectively on the same one side in the rotational axis direction (in other words, the blade section 35 accommodated within the cavity 43 forms the first pressure chamber 51 and the second pressure chamber 52). Furthermore, in each of the first pressure chambers 51 there is provided each passage hole 34c of the vane rotor 33 so as to open with a one-to-one correspondence, while in each of the second pressure chambers 52 there is provided each passage hole 34d of the vane rotor 33 so as to open with a one-to-one correspondence.

At this time, the main permanent magnet mounting layer 21 relatively turns to the maximum limit towards the side of the passage hole 34d of the vane rotor 33. However, the notch section 42c is present, and therefore the passage hole 34d is not blocked and furthermore the passage groove 31h of the first drive plate 31 is not blocked either. As a result, the passage hole 34d and the passage groove 31h are always open to the second pressure chamber 52. That is to say, the notch section 42c enables the passage groove 31h to be always open to the first pressure chamber 51.

On the other hand, in a strong magnetic field state, as shown in FIG. 9 and FIG. 10, all of the blade sections 35, within the corresponding cavities 43, are respectively in contact with the adjacent protruding sections 42 on the same one side in the rotational direction, and the first pressure chamber 51 is formed between the blade section 35 and the protruding sections 42 in contact, while the second pressure chamber 52 that is larger than the first pressure chamber 51 is formed between the blade section 35 and the respectively adjacent protruding sections 47 on the same opposite side in the rotational direction. At this time, the main permanent magnet mounting layer 21 relatively turns to the maximum limit towards the side of the passage hole 34c of the vane rotor 33.

However, the notch section 42 is present and therefore the passage hole 34c is not blocked. As a result, the passage hole 34c is always open to the first pressure chamber 51.

Here, the main permanent magnet mounting layer 21, and the first sub permanent magnet mounting layer 22 and the second sub permanent magnet mounting layer 23 are such that the phase position thereof in a weak magnetic field state where the phase stable region is relatively greater due to the attraction force of the main permanent magnet 21a and the first and second sub permanent magnets 22a and 23a, is set to the point of origin where the first pressure chamber 51 and the second pressure chamber 52 practically do not receive an operating hydraulic pressure.

Furthermore, from this state where the phase position is in the point of origin, when the operating oil is introduced into each second pressure chamber 52 through each passage hole 34d that is always open at the notch section 42c (that is to say, if the operating hydraulic pressure is introduced into the second pressure chamber 52), the main permanent magnet mounting layer 21, and the first sub permanent magnet mounting layer 22 and the second sub permanent magnet mounting layer 23 will relatively rotate against the magnetic force, and will be brought into the strong magnetic field state shown in FIG. 9 and FIG. 10.

In this strong magnetic field state, the phase stable region becomes relatively narrower due to the repulsion force of the main permanent magnet 21a, and the first and second sub permanent magnets 22a and 23a. Therefore, when the operating oil is discharged from each second pressure chamber 52 through each passage hole 3d, the main permanent magnet mounting layer 21, and the first sub permanent magnet mounting layer 22 and the second sub permanent magnet mounting layer 23 will relatively rotate towards a weak magnetic field state, which is the point of origin, and their positions will change to a phase position where the main permanent magnet 21a and the first and second sub permanent magnets 22a and 23a are attracted to each other by the magnetic force.

Here, since the operating oil is incompressible, then of course if there is a change in phase at the ends of the two limits of the strong magnetic field state and the weak magnetic field state mentioned above, or even at the intermediate position between the ends of the two limits, as a result of the hydraulic control device 25a shutting off, for example, the opening/closing valve (not shown in the drawing), to stop feeding and discharging of the operating oil from the first pressure chambers 51 and the second pressure chambers 52, the main permanent magnet mounting layer 21, and the first sub permanent magnet mounting layer 22 and the second sub permanent magnet mounting layer 23 maintain their phase relationship at this point, and the change in phase at any arbitrary magnetic field state can be stopped.

In any of the states from the strong magnetic field state to the weak magnetic field state mentioned above, the passage grooves 31h formed in the first drive plate 31 and the passage grooves 32h formed in the second drive plate 32 are linked to the second pressure chambers 52. Therefore, the operating oil flows from the passage grooves 31h and 32h to the passage grooves 31g and 32g due to the centrifugal force, and a part of the operating oil travels within the passage grooves 31g and 32g appropriately in the circumferential direction so as to be discharged outside from the passage grooves 31j and 32j.

Therefore, the above mentioned vane rotor 33 is integrally fixed to the first sub permanent magnet mounting layer 22 and the second sub permanent magnet mounting layer 23 so as to be able to integrally rotate, and is arranged inside the main permanent magnet mounting layer 21. In addition, the vane rotor 33 is rotatably supported by the first and second drive plates 31 and 32 fixed on the main permanent magnet mounting layer 21 so as to cover both end surfaces in the rotational axis direction of the main permanent magnet mounting layer 21, and is provided integrated to the output shaft 38. Moreover, the cavity 43 of the main permanent magnet mounting layer 21 is partitioned by the vane rotor 33, into the first pressure chamber 51 and the second pressure chamber. Furthermore, with control of operating oil feeding/discharging to these first pressure chambers 51 and the second pressure chambers 52, that is, operating hydraulic pressure introduction control, the phase of the vane rotor 33 relative to the main permanent magnet mounting layer 21 is changed. As a result, the relative phase between the main permanent magnet mounting layer 21, and the first sub permanent magnet mounting layer 22 and the second sub permanent magnet mounting layer 23 is changed. Here, the relative phase between the main permanent magnet mounting layer 21, and the first sub permanent magnet mounting layer 22 and the second sub permanent magnet mounting layer 23 can be changed to the advance angle side or the lag angle side by at least only an electrical angle of 180°, and it is possible to set the state of the electric motor 10 to an appropriate state between: the weak magnetic field where a magnetic path short circuit occurs between the first sub permanent magnet 22a and the second sub permanent magnet 23a, and the main permanent magnet 21a, and the effective magnetic flux interlinked with the respective stator windings 12a and 13a relatively decreases; and the strong magnetic field state where the magnetic flux converges with a magnetic flux lens effect due to the so-called Halback array of permanent magnets, and the effective magnetic flux interlinked with the respective stator windings 12a and 13a relatively increases.

The main permanent magnet 21a has a relatively higher level of residual magnetic flux density compared to at least either one of the first sub permanent magnet 22a and the second sub permanent magnet 23a.

Furthermore, at least either one of the first sub permanent magnet 22a and the second sub permanent magnet 23a has a relatively higher level of coercive force compared to the main permanent magnet 21a.

Moreover, the main permanent magnet 21a, and the first sub permanent magnet 22a and the second sub permanent magnet 23a are permanent magnets made from equivalent materials, and the main permanent magnet 21a has a relatively higher magnet gross amount (that is, magnet volume) compared to at least either one of the first sub permanent magnet 22a and the second sub permanent magnet 23a.

Figure 12:
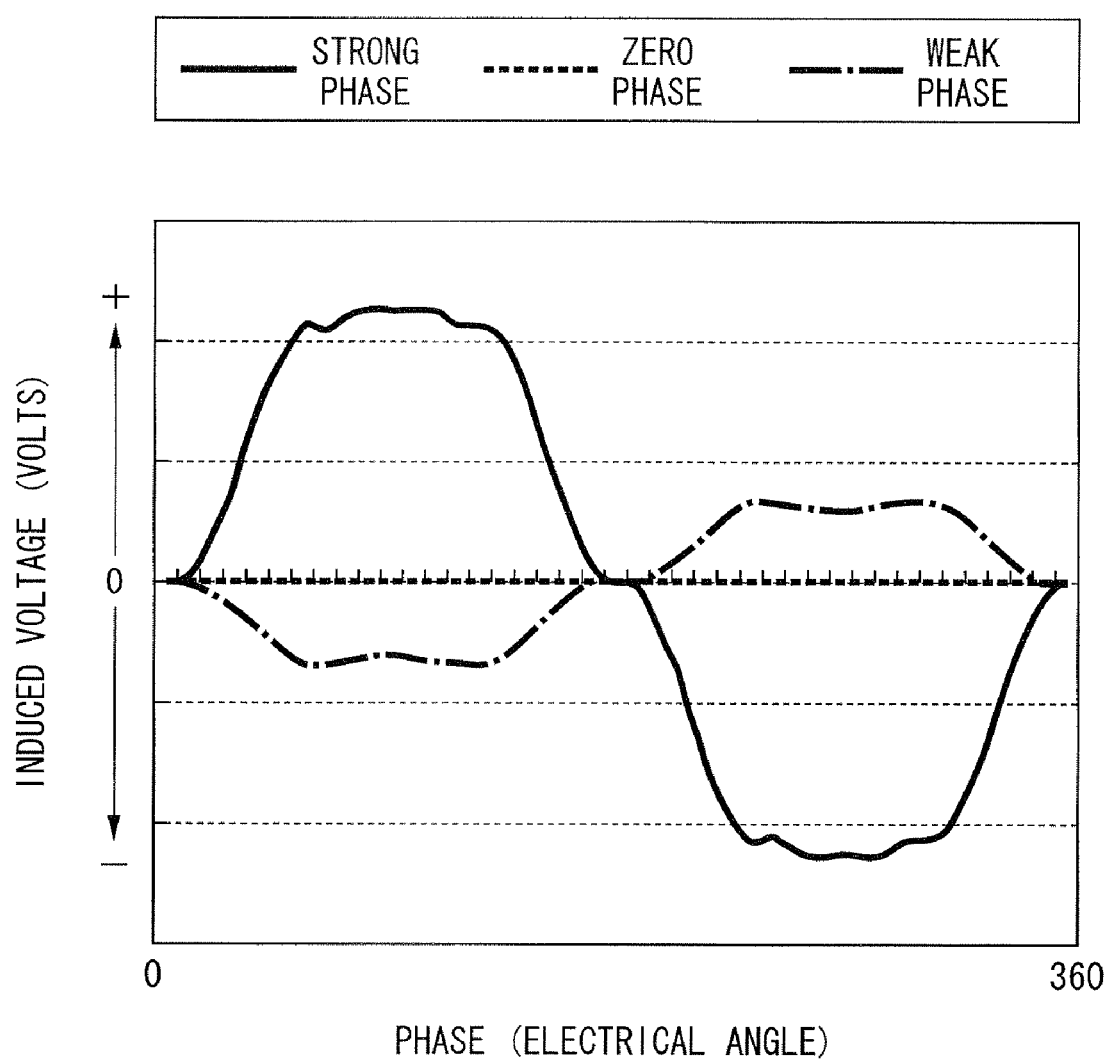
FIG. 12 is a graph showing induced voltages of the motor according to the embodiment of the present invention, in a strong magnetic field state and a weak magnetic field state.
Figure 13A:
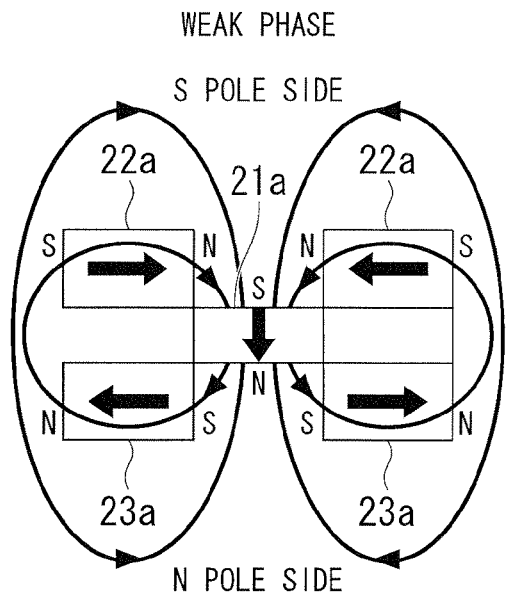
FIG. 13A is a drawing of an arrangement state of the main permanent magnet and first and second sub permanent magnets of the motor according to the embodiment of the present invention in a weak magnetic field state, seen from the radial direction.
Figure 13B:
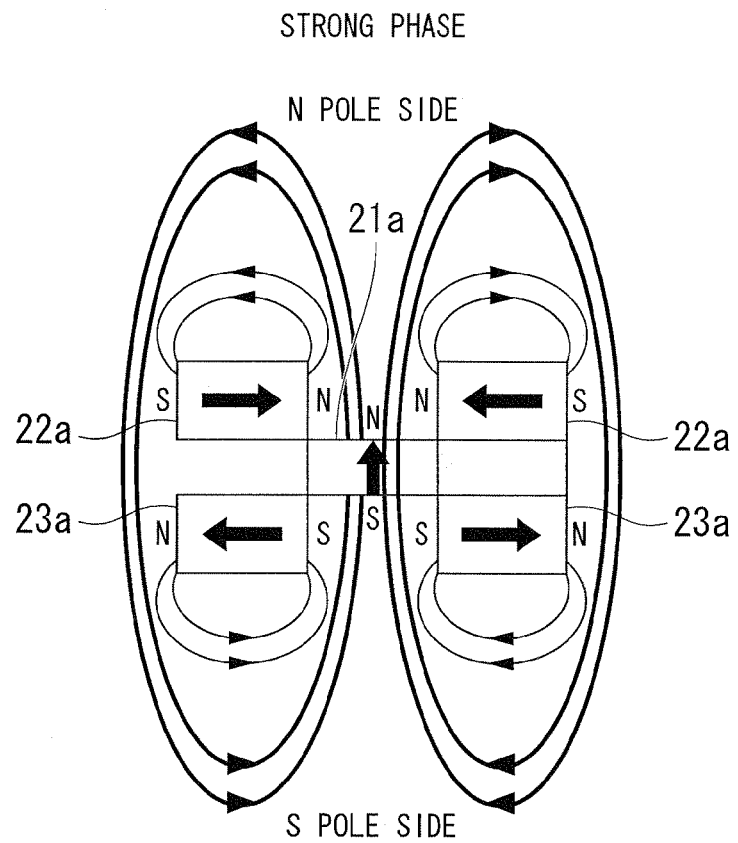
FIG. 13B is a plan view of an arrangement state of the main permanent magnet and first and second sub permanent magnets of the motor according to the embodiment of the present invention in a strong magnetic field state, seen from the radial direction.

Thus, as shown in FIG. 12, and FIG. 13A and FIG. 13B for example, the sign for the induced voltage of the motor 10 in the weak magnetic field state is inversed to that for the induced voltage of the motor 10 in the strong magnetic field state. That is to say, as a result of the change occurring in the relative phase between the main permanent magnet mounting layer 21, and the first sub permanent magnet mounting layer 22 and the second sub permanent magnet mounting layer 23, it becomes possible to set the induced voltage constant of the motor 10 to an appropriate value between a positive value and negative value, and for example, it also becomes possible to set the relative phase to a zero phase where the induced voltage constant and induced voltage become zero.

Figure 14A:
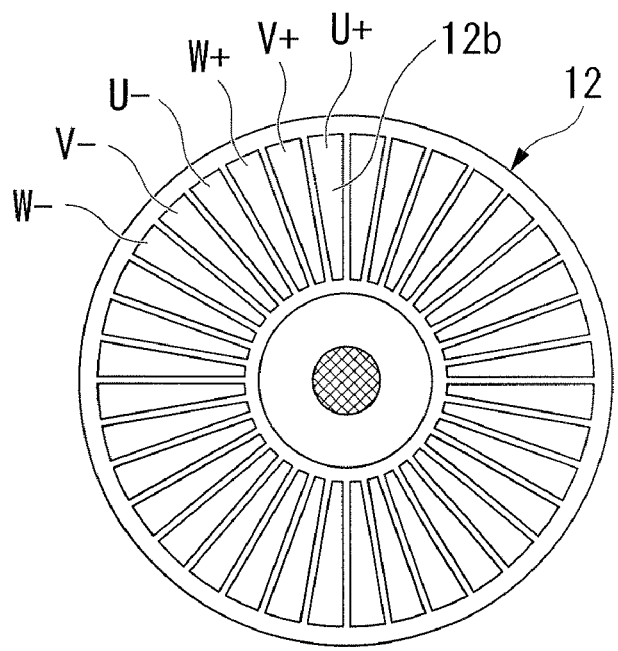
FIG. 14A is a plan view of a first stator of the motor according to the embodiment of the present invention, seen from the rotational axis direction.
Figure 14B:
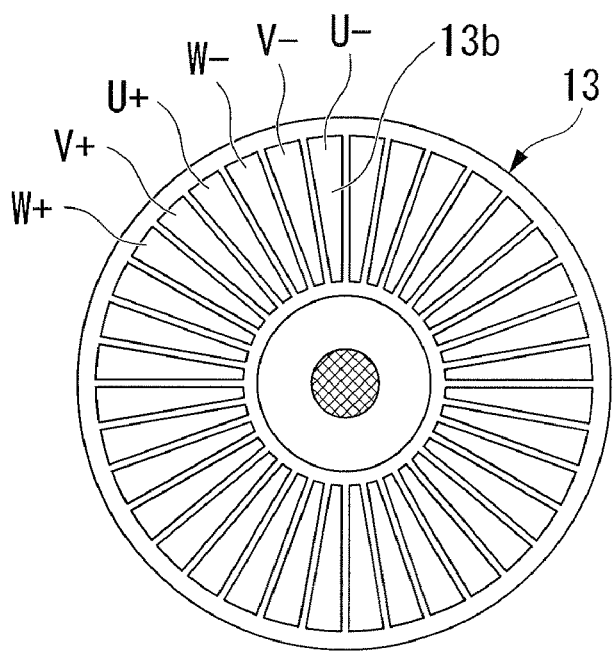
FIG. 14B is a plan view of a second stator of the motor according to the embodiment of the present invention, seen from the rotational axis direction.

The first stator 12 and the second stator 13, as shown in FIG. 2, FIG. 14A, and FIG. 14B for example, are 6N type stators with six main poles (for example, $U^+, V^+, W^+, C^-, V^-, W^-$), and the magnetic field fluxes formed by the respective permanent magnets 21a, 22a, and 23a of the rotor 11, in particular, the magnetic field fluxes in a strong magnetic field state are swept between the first and second stators 12 and 13 that form a pair in the rotational axis direction. That is to say, the first and second stators 12 and 13 are set so that the respective $U^+$, $V^+$ and $W^+$ poles of the one stator oppose, in the rotational axis direction, the respective $U^-$, $V^-$ and $W^-$ poles of the other stator.

The first stator and the second stator 13 may be 12N type stators with twelve main poles.

Furthermore, as shown in FIG. 2 for example, with respect to each of the respective main permanent magnets 21a of the rotor 11, respective three of the teeth of each of the stators 12 and 13, that is: three of teeth 12b of the first stator 12 that correspond to one of either set of the $U^+$, $V^+$ and $W^+$ poles and $U^-$, $V^-$ and $W^-$ poles; and three of teeth 13b of the second stator 13 that correspond to the other set of $U^+$, $V^+$ and $W^+$ poles and $U^-$, $V^-$ and $W^-$ poles, are set so as to oppose to each other in the rotational axis direction.

Moreover, for example, with respect to each of the respective sub permanent magnets 22a and 23a of the rotor 11, respective two of the teeth of each of the stators 12 and 13, that is for example: two of teeth 12b of the first stator 12 that correspond to one of either set of the $W^+$ and $U^-$ poles, and $U^-$ and $W^-$ poles; and two of teeth 13b of the second stator 13 that correspond to the other set of $W^+$ and $U^-$ poles, and $U^-$ and $W^-$ poles, are set so as to oppose to each other in the rotational axis direction.

As shown in FIG. 2 for example, in the respective stators 12 and 13, the respective stator windings 12a and 13a are wound, for example, in a distributed winding, a short pitch winding, and a double-layer winding.

Thus, as shown in FIG. 2 for example, there can be provided magnetic paths so that the direction of the magnet magnetic flux due to the respective permanent magnets 21a, 22a, and 23a of the rotor 11 opposes the direction of electric current magnetic flux due to the respective stator windings 12a and 13a, thereby suppressing magnetic saturation in the iron cores that form the respective stators 12 and 13 caused by the directions of the magnet magnetic flux and electric current magnetic flux becoming the same direction.

Figure 15:
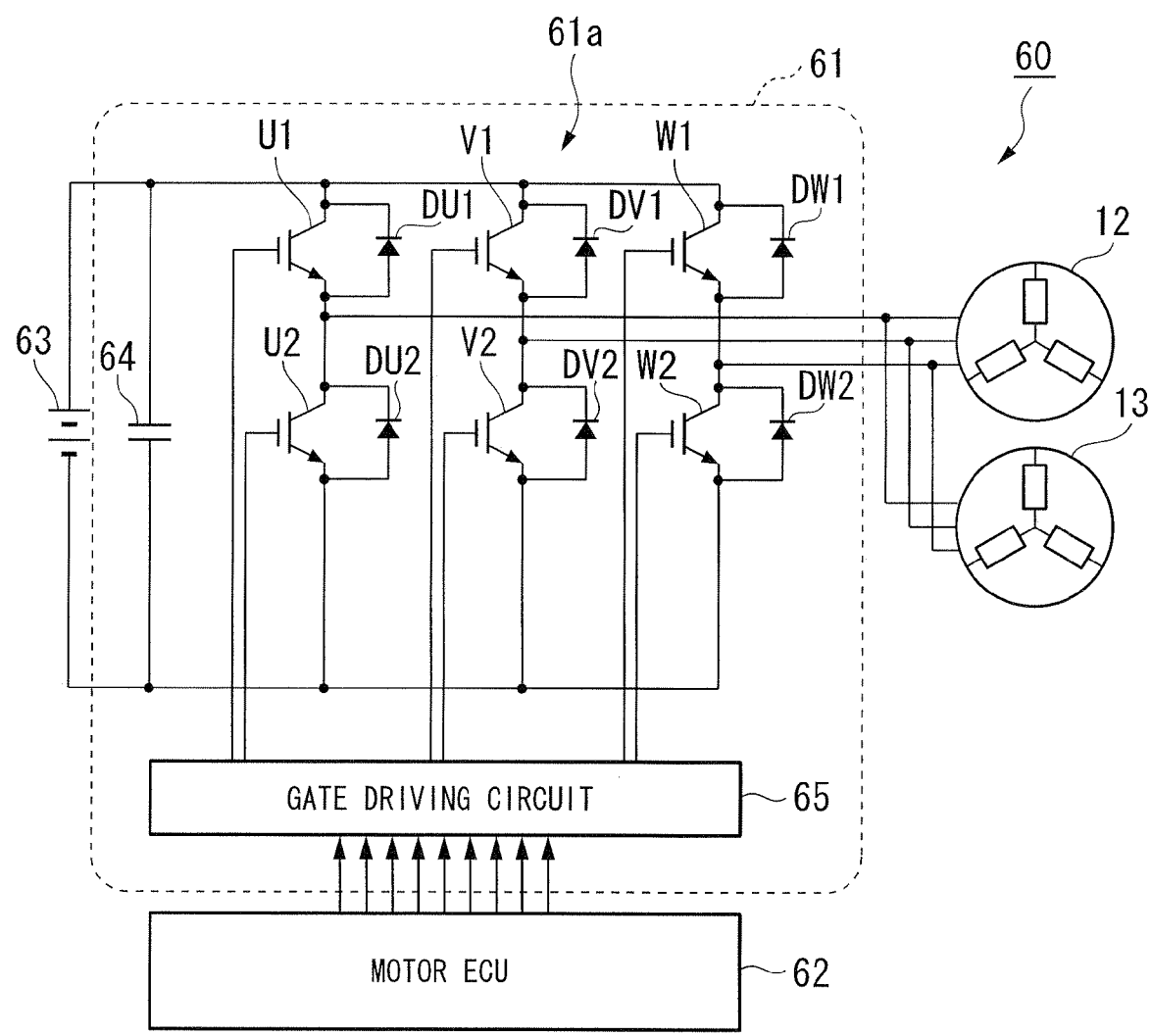
FIG. 15 is a configuration diagram of a motor control device according to the embodiment of the present invention.

A motor control device 60 that drive-controls the motor 10 according to the present embodiment, as shown for example in FIG. 15, is provided with an inverter circuit 61, a motor ECU 62, and a battery 63 that serves as a direct current power supply.

The inverter circuit 61, for example, is provided with a bridge circuit 61a that is bridge-connected with use of a plurality of switching elements of transistors (for example, IGBT: insulated gate bipolar mode transistor), a smoothing capacitor 64, and a gate driving circuit 65.

This bridge circuit 61a is an inverter circuit in which two series circuits are configured with transistors U1 and U2, V1 and V2, and W1 and W2 respectively arranged in two steps, and these two series circuits are connected in parallel.

Collectors of the respective transistors U1, V1, and W1 are connected to a positive side terminal of the battery 63; emitters of the respective transistors U2, V2, and W2 are connected to a negative side terminal of the battery 63; emitters of the respective transistors U1, V1, and W1 are connected to collectors of the respective transistors U2, V2, and W2; and between the collectors and emitters of the respective transistors U1 and U2, V1 and V2, and W1 and W2, there are connected, in a forward direction from the emitters to the collectors, respective diodes DU1 and DU2, DV1 and DV2, and DW1 and DW2.

Furthermore, the smoothing capacitor 64 is connected between the positive side terminal and the negative side terminal of the battery 63.

The gate driving circuit 65 inputs, according to gate signals input from the motor ECU 62, pulses for ON/OFF-driving the respective transistors U1 and U2, V1 and V2, and W1 and W2, that is, pulses for controlling, with pulse width modulation (PWM), continuity (ON) and discontinuity (OFF) between the collectors and emitters of the respective transistors U1 and U2, V1 and V2, and W1 and W2, to the gates of the respective transistors U1 and U2, V1 and V2, and W1 and W2.

The motor ECU 62, for example, performs feedback control of electric current on dq coordinates, which are rotational orthogonal coordinates, and it, for example: calculates a target d axis electric current and a target q axis electric current from a torque command input from an external control device; calculates each phase output voltage of three phases based on the target d axis electric current and the target q axis electric current; and inputs a PWM signal, which is a gate signal, to the inverter circuit 61 according to each phase output voltage, while it performs control so that each deviation between: a d axis electric current and a q axis electric current acquired by converting the detected values of respective phase electric currents I1u, I1v and I1w actually supplied from the inverter circuit 61 to the motor 10; and the target d axis electric current and the target q axis electric current, becomes zero.

For example, when driving the motor 10, the motor ECU 62, with pulse width modulation based on each of the sinusoidal phase output voltages and triangular wave carrier signals, generates gate signals (that is, pulse width modulation signals), which are switching commands including respective pulses that ON/OFF drive the respective switching elements of the inverter circuit 61. By switching, in the inverter circuit 61, the ON (continuity)/OFF (discontinuity) state of respective pairs of transistors U1 and U2, V1 and V2, and W1 and W2 for the respective three phases, direct current power supplied from the battery 63 is converted into three phase alternating current power, and by sequentially commuting the current flow to the respective stator windings 12a and 13a of the three phase motor 10, an alternating U phase electric current I1u, V phase electric current I1v and W phase electric current I1w are conducted to the respective stator windings 12a and 13a.

Duties of the pulses for ON/OFF driving the respective transistors U1 and U2, V1 and V2, and W1 and W2 with pulse width modulation (PWM), that is, a map (data) for the ON/OFF ratio are pre-stored in the motor ECU 62.

Consequently, the motor ECU 14 receives inputs of: a detection signal output from an electric current sensor that detects at least any two of the respective phase electric currents I1u, I1v and I1w (for example, V phase electric current I1v and W phase electric current I1w) supplied to each of the respective stator windings 12 and 13a of the first stator 12 and the second stator 13; a detection signal output from a rotation sensor that detects a rotation angle θ of the rotor 11 of the motor 10 to be used in coordinate conversion processing (that is, a rotation angle of the magnetic pole of the rotor 11 from a predetermined reference rotation position); and a detection signal output from a voltage sensor that detects a terminal voltage (power supply voltage) of the battery 63.

As mentioned above, according to the motor 10 of the present embodiment, first, in the proximity of both end sections in the rotational axis direction of the main permanent magnet 21a there are provided the first sub permanent magnet 22a and the second sub permanent magnet 23a that are magnetized in a direction orthogonal to the magnetization direction of the main permanent magnet 21a, and thereby the magnetic flux lens effect due to the so-called Halback array of the permanent magnets can cause the magnetic fluxes of the respective permanent magnets 21a, 22a, and 23a to converge, or the respective permanent magnets 21a, 22a, and 23a can cause a magnetic path short circuit to occur. Thus, in a state where the magnetic fluxes converge, the amount of magnetic fluxes interlinked with the respective stator windings 12a and 13a of the first stator 12 and the second stator 13 can be increased, and in a state where a magnetic path short circuit is generated, demagnetization of the respective permanent magnets 21a, 22a, and 23a can be suppressed.

Furthermore, for example, by arranging one set of the first sub permanent magnet 22a and the second sub permanent magnet 23a and the other set of first sub permanent magnet 22a and the second sub permanent magnet 23a so that the magnetization directions thereof become symmetric to the main permanent magnet 21a, it is possible to further effectively generate a magnetic flux convergence caused by the magnetic flux lens effect due to the so-called Halback array of permanent magnets, or a magnetic path short circuit caused by the respective permanent magnets 21a, 22a, and 23a.

Moreover, by changing, with the phase change mechanism 25, the relative phase between the first sub permanent magnet mounting layer 22 and the second sub permanent magnet mounting layer 23, and the main permanent magnet mounting layer 21, the state of the motor 10 can be set to an appropriate magnetic field state between: a strong magnetic field state where the magnetic flux lens effect due to the so-called Halback array of permanent magnets causes the magnetic fluxes to converge; and a weak magnetic field state where a magnetic path short circuit is generated by the respective permanent magnets 21a, 22a, and 23a, and by having the magnetic field fluxes due to the respective permanent magnets 21a, 22a, and 23a increase or reduce the amount of interlinked magnetic fluxes interlinked with the stator windings 12a and 13a, the induced voltage constant can be variably changed. Consequently, the rotational speed range and torque range, within which the motor 10 can be operated, are increased, and thereby the operation efficiency can be improved while the possible operation range can be increased at a high level of efficiency.

Furthermore, as a result of making the phase change mechanism 25 as a vane actuator including the respective pressure chambers 51 and 52 into which fluid pressure is to be supplied, and the vane rotor 33 that receives the fluid pressure to rotate, then for example, by controlling the amount of the operating fluid to be supplied to the second pressure chamber 52, the relative phase between the first sub permanent magnet mounting layer 22 and the second sub permanent magnet mounting layer 23, and the main permanent magnet mounting layer 21 can be changed to a desired phase, while suppressing complexity of the configuration of the motor, and allowing easy and appropriate variable changes in the induced voltage constant.

In addition, by setting the main permanent magnet 21a, with which the magnetic field from the respective stators 12 and 13 are relatively unlikely to become a demagnetizing field, so that the residual magnetic flux density becomes relatively higher compared to the first sub permanent magnet 22a and the second sub permanent magnet 23a, and by setting the first sub permanent magnet 22a and the second sub permanent magnet 23a, with which the magnetic field from the respective stators 12 and 13 are relatively likely to become a demagnetizing field, so that the coercive force becomes relatively higher compared to the main permanent magnet 21a, it is possible to suppress demagnetization of the first sub permanent magnet 22a and the second sub permanent magnet 23a caused by the magnetic field from the respective stators 12 and 13, while further increasing the amount of magnetic fluxes interlinked with the stator windings 12a and 13a of the respective stators 12 and 13.

In addition, since the main permanent magnet 21a, compared to at least either one of the first sub permanent magnet 22a and the second sub permanent magnet 23a, has a relatively greater magnet gross amount (that is, magnet volume), it is possible to set the induced voltage constant of the motor 10 to an appropriate value between a positive value and a negative value, while effectively increasing the variable ratio of the induced voltage constant.

As a result, for example, in the case of reducing the regenerating amount when the motor 10 is in a regenerative operation, there is no need for conducting a phase electric current having a phase opposite to that of the induced voltage, to the respective stators 12 and 13, and the motor 10 only needs to be shifted to a weak magnetic field state to reverse the sign of the induced voltage constant from positive to negative. Therefore, when the motor 10 is in a power running operation or in a regenerative operation, the phase of the phase electric current to be conducted to the respective stators 12 and 13 can be invariably maintained.

Moreover, since it is possible to set the relative phase between the main permanent magnet mounting layer 21, and the first sub permanent magnet mounting layer 22 and the second sub permanent magnet mounting layer 23 to a zero phase where the induced voltage constant and the induced voltage become zero, then for example even in the case where the motor 10 is to be driven by an external driving force as in the case where a driving force is transmitted from the driving wheel side to the motor 10 when the vehicle is decelerating, it is possible, provided that electric current from this regenerative operation is not required, to have a zero induced voltage constant and a zero induced voltage, and defects in various types of electrical components caused by unwanted electric power generation can be prevented.

In the above described embodiment, the phase change mechanism 25 may be such that for either one of the main permanent magnet mounting layer 21, and the first sub permanent magnet mounting layer 22 and the second sub permanent magnet mounting layer 23, there are provided the first pressure chamber 51 and the second pressure chamber 52, and for the another, there is integrally provided the vane rotor 33.

In the above described embodiment, the phase change mechanism 25 is such that the operating hydraulic pressure that acts in the hollow section 21c in the main permanent magnet mounting layer 21 and the respective pressure chambers 51 and 52 formed with the vane rotor 33, is controlled, and the relative phase between the main permanent magnet mounting layer 21, and the first sub permanent magnet mounting layer 22 and the second sub permanent magnet mounting layer 23 is thereby changed to a desired phase. However, the phase change mechanism 25 is not limited to this and may be such that according to the rotational driving force that acts on the main permanent magnet mounting layer 21 with the main permanent magnet 21a mounted thereon, the relative phase between the first sub permanent magnet mounting layer 22 and the second sub permanent magnet mounting layer 23, and the main permanent magnet mounting layer 21 is changed to a desired phase.

Figure 16A:
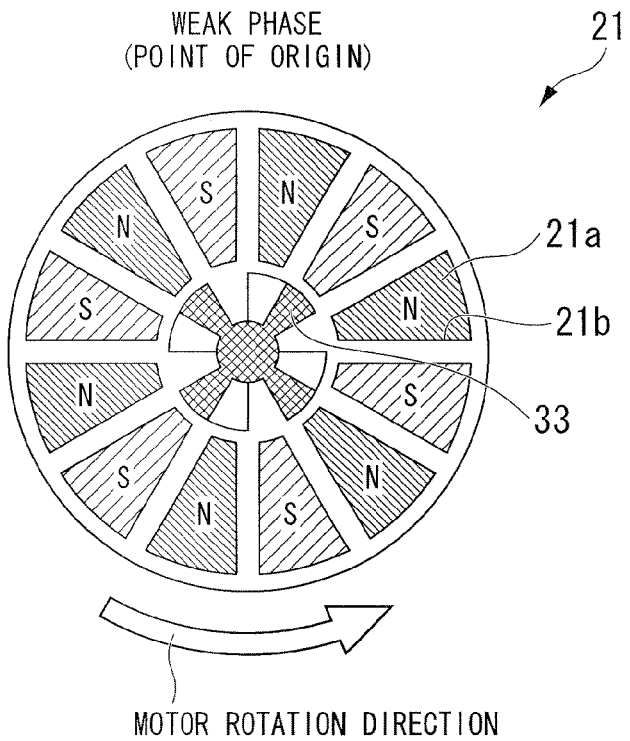
FIG. 16A is a plan view of the main permanent magnet mounting layer of the rotor of the motor according to a first modified example of the embodiment of the present invention in a weak magnetic field state, seen from the rotational axis direction.

In this first modified example, as shown in FIG. 8 and FIG. 16A for example, the phase position in a weak magnetic field state, where the phase stable region is relatively wide due to the attractive force between the main permanent magnet 21a and the first and second sub permanent magnets 22a and 23a, is set in an origin point position. In this weak magnetic field state, all the blade sections 35, respectively in corresponding cavities 43, are in contact with protruding sections 42 adjacent to each other on the above mentioned same opposite side in the rotational direction, and the second pressure chamber 52 is formed between the blade section 35 and the adjacent protruding section 42, while the first pressure chamber 51, which is larger than the second pressure chamber 52, is formed between the blade section 35 and the respectively adjacent protruding sections 42 on the same one side in the rotational direction.

Figure 16B:
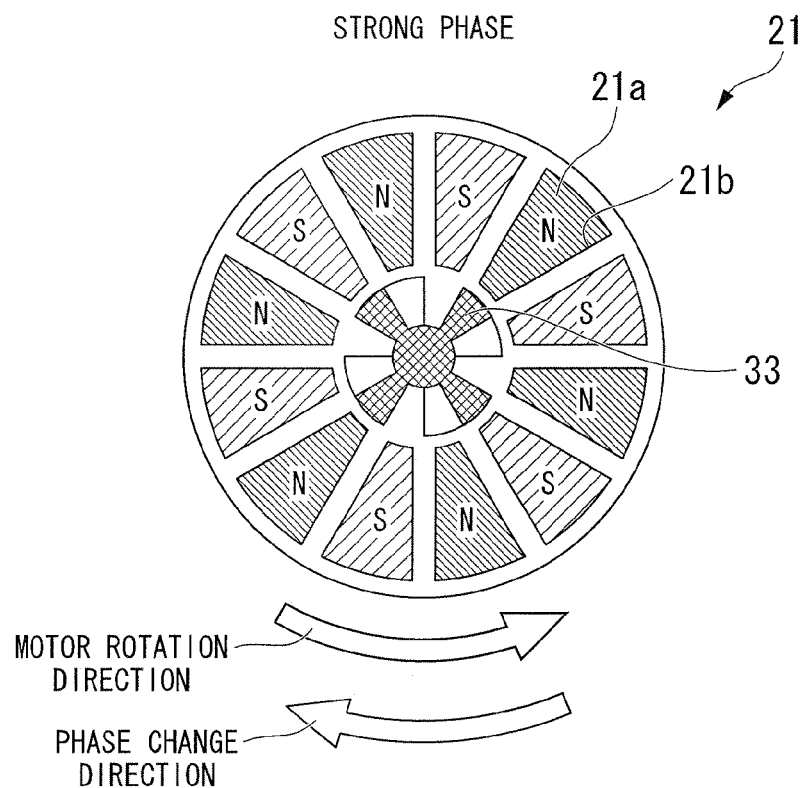
FIG. 16B is a plan view of the main permanent magnet mounting layer of the rotor of the motor according to the first modified example of the embodiment of the present invention in a strong magnetic field state, seen from the rotational axis direction.

Moreover, if a rotational driving force that is greater than a predetermined value acts on the motor 10 so as to oppose the attractive force of the respective permanent magnets 21*a*, 22*a*, and 23*a* in this weak magnetic field state, the main permanent magnet mounting layer 21 of the rotor 11, and the first and second sub permanent magnet mounting layers 22 and 23 rotate against the magnetic force, and as shown in FIG. 9 and FIG. 16B for example, the state is brought into a strong magnetic field state where all the blade sections 35, within the respectively corresponding cavities 43, come in contact with the protruding sections 42 adjacent to each other on the same one side in the rotational direction so as to form the first pressure chamber 51 between the blade section 35 and the protruding section 42, while forming the second pressure chamber 52, which is larger than the first pressure chamber 51, between the blade section 35 and the respectively adjacent protruding sections 42 on the same opposite side in the rotational direction.

In this strong magnetic field state, the phase stable region becomes relatively narrower due to the repulsion force between the main permanent magnet 21*a*, and the first and second sub permanent magnets 22*a* and 23*a*. Therefore, if the rotational driving force that acts on the motor 10 becomes less than the predetermined value, the main permanent magnet mounting layer 21, and the first sub permanent magnet mounting layer 22 and the second sub permanent magnet mounting layer 23 will relatively rotate towards a weak magnetic field state, which is the point of origin, and their positions will change to a phase position where the main permanent magnet 21*a* and the first and second sub permanent magnets 22*a* and 23*a* are attracted to each other by the magnetic force.

In the above described embodiment, the phase change mechanism 25 is such that by controlling the operating hydraulic pressure that acts on the respective pressure chambers 51 and 52 formed by the hollow section 21*c* of the main permanent magnet mounting layer 21 and the vane rotor 33, the relative phase between the main permanent magnet mounting layer 21, and the first sub permanent magnet mounting layer 22 and the second sub permanent magnet mounting layer 23 is changed to a desired phase. However, the phase change mechanism 25 is not limited to this, and may be such that the relative phase between the main permanent magnet mounting layer 21, and the first sub permanent magnet mounting layer 22 and the second sub permanent magnet mounting layer 23 is changed to a desired phase with a planetary gear mechanism.

Figure 17:
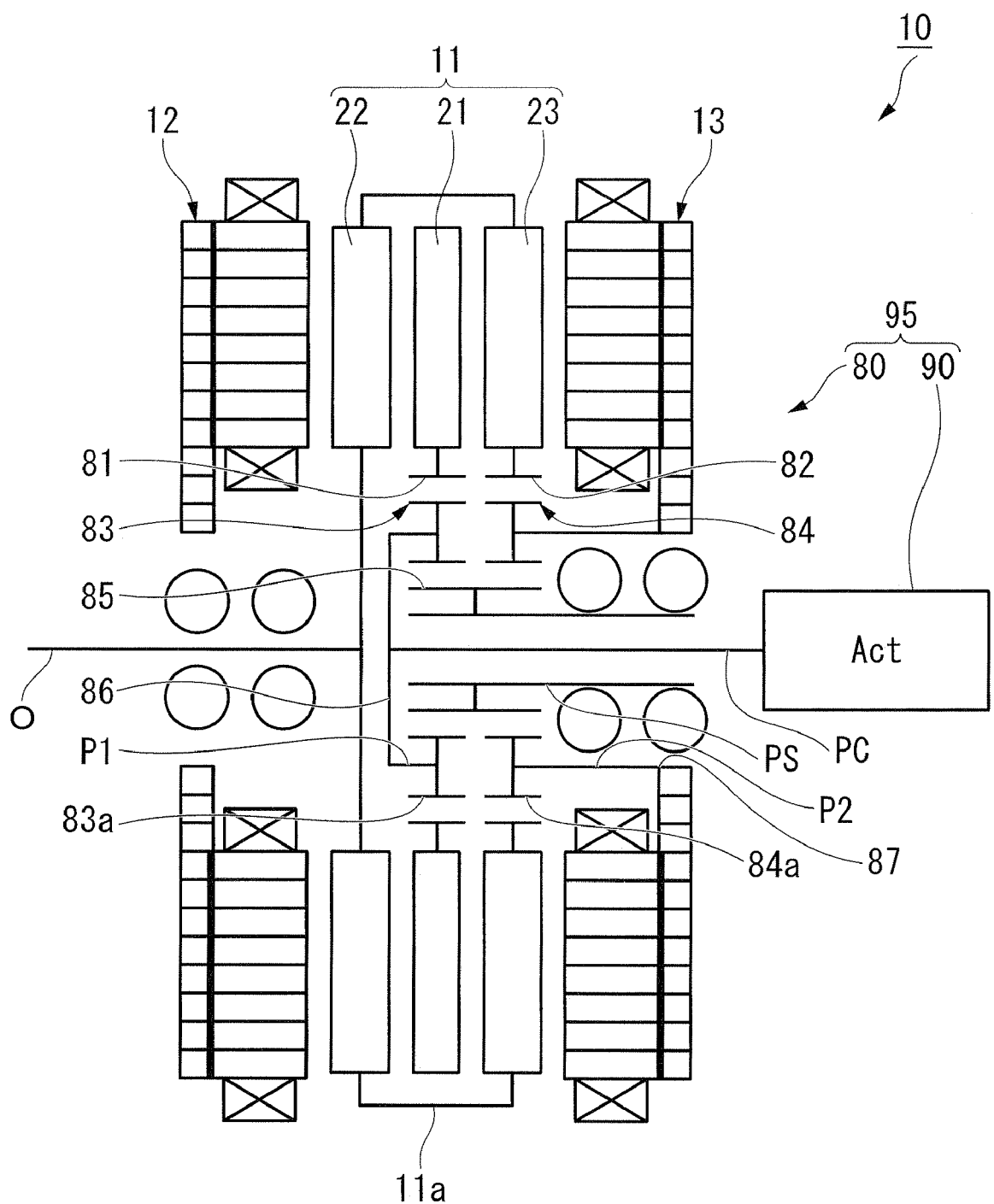
FIG. 17 is a drawing schematically showing a configuration of the motor according to a second modified example of the embodiment of the present invention.

In this second modified example, a phase change mechanism 95, as shown in FIG. 17 for example, is provided with: a planetary gear mechanism 80 connected to the main permanent magnet mounting layer 21, and the first sub permanent magnet mounting layer 22 and the second sub permanent magnet mounting layer 23; and an actuator 90 that sets the relative phase between the main permanent magnet mounting layer 21, and the first sub permanent magnet mounting layer 22 and the second sub permanent magnet mounting layer 23.

The first sub permanent magnet mounting layer 22 and the second sub permanent magnet mounting layer 23 are integrally connected to each other by a connection section 11*a*.

The planetary gear mechanism 80, as shown in FIG. 17 for example, is provided with: a first ring gear (R1) 81 that is arranged in the hollow section on the inner circumferential side to the rotor 11 and that is formed so as to be integrated with and concentric with the main permanent magnet mounting layer 21; a second ring gear (R2) 82 that is formed so as to be integrated with and concentric with the second sub permanent magnet mounting layer 23 integrally connected to the first sub permanent magnet mounting layer 22; a single-row first planetary gear train 83 that meshes with the first ring gear (R1) 81; a single-row second planetary gear train 84 that meshes with the second ring gear (R2) 82; a sun gear (S) 85 that serves as an idle gear and meshes with the first planetary gear train 83 and the second planetary gear train 84; a first planetary carrier (C1) 86 that, about each first planetary rotation shaft P1, rotatably supports a plurality of first planetary gears 83*a* that form either one of the first planetary gear train 83 and the second planetary gear train 84, for example, the first planetary gear train 83, and that can rotate about the rotation shaft O; and a second planetary carrier (C2) 87 that, about each second planetary rotation shaft P2, rotatably supports a plurality of second planetary gears 84*a* that form either one of the first planetary gear train 83 and the second planetary gear train 84, for example, the second planetary gear train 84, and that is fixed to the second stator 13.

That is to say, this planetary gear mechanism 80 is a single pinion type planetary gear mechanism provided with the respectively single-row first planetary gear train 83 and second planetary gear train 84.

In this planetary gear mechanism 80, each outer diameter of the first ring gear (R1) 81 and the second ring gear (R2) 82 is formed smaller than the inner diameter of the rotor 11, and the first ring gear (R1) 81 and the second ring gear (R2) 82 that are concentrically arranged so as to be adjacent to each other along the direction parallel with the rotation shaft O, are arranged in a hollow section on the inner circumferential side to the rotor 11.

Furthermore, the first ring gear (R1) 81 that is arranged in a position, with respect to the arrangement position of the second ring gear (R2) 82, displaced to one side in the direction parallel with the rotation shaft O, is rotatably supported on a bearing and is connected to the rotation shaft O extending towards the one side.

The first planetary carrier (C1) 86 is arranged in a position, with respect to the arrangement position of the first planetary gear train 83 that meshes with the first ring gear (R1) 81, displaced to one side in the direction parallel with the rotation shaft O, and is rotatably inserted through the hollow section of a rotation shaft PS of the hollow-formed sun gear (S) 85, and connected to a rotation shaft PC extending towards the other side.

Moreover, the second planetary carrier (C2) 87 is arranged in a position, with respect to the arrangement position of the second planetary gear train 84 that meshes with the second ring gear (R2) 82, displaced to the other side in the direction parallel with the rotation shaft O.

In this planetary gear mechanism 80, the first ring gear (R1) 81 and the second ring gear (R2) 82 have substantially the same gear shape, and each of the plurality of the first planetary gears 83*a* that form the first planetary gear train 83 and each of the plurality of the second planetary gears 84*a* that form the second planetary gear train 84 have substantially the same gear shape. The rotation shaft PS of the sun gear (S) 85 is arranged concentric with the rotation shaft O of the motor 10, and is rotatably supported on a bearing. Thus, the first planetary gear train 83 and the second planetary gear train 84 mesh with the sun gear (S) 85, which serves as an idle gear, to thereby synchronous-rotate the main permanent magnet mounting layer 21, and the first sub permanent magnet mounting layer 22 and the second sub permanent magnet mounting layer 23.

Furthermore, the rotation shaft PC of the first planetary carrier (C1) 86 is arranged concentric with the rotation shaft O of the motor 10, and is connected to the actuator 90, and the second planetary carrier (C2) 87 is fixed to the second stator 13.

Moreover, the actuator 90 is controlled according to an input of control commands, for example, received from an external control device, and is provided with a hydraulic pump (not shown in the drawing) or the like that converts fluid energy into a rotational movement, and it regulates turning of the first planetary carrier (C1) 86 about the rotation shaft O (that is to say, it holds the first planetary carrier (C1) 86 at a predetermined turning position), or turns the first planetary carrier (C1) 86, with an advance angle motion or lag angle motion, about the rotation shaft O in a forward rotation direction or reverse rotation direction only by a predetermined turning amount. Thus, when the actuator 90 turns the first planetary carrier (C1) 86 about the rotation shaft O, regardless of whether the motor 10 is in the operating state or in the stop state, the relative phase between the main permanent magnet mounting layer 21, and the first sub permanent magnet mounting layer 22 and the second sub permanent magnet mounting layer 23 changes.

Figure 18:
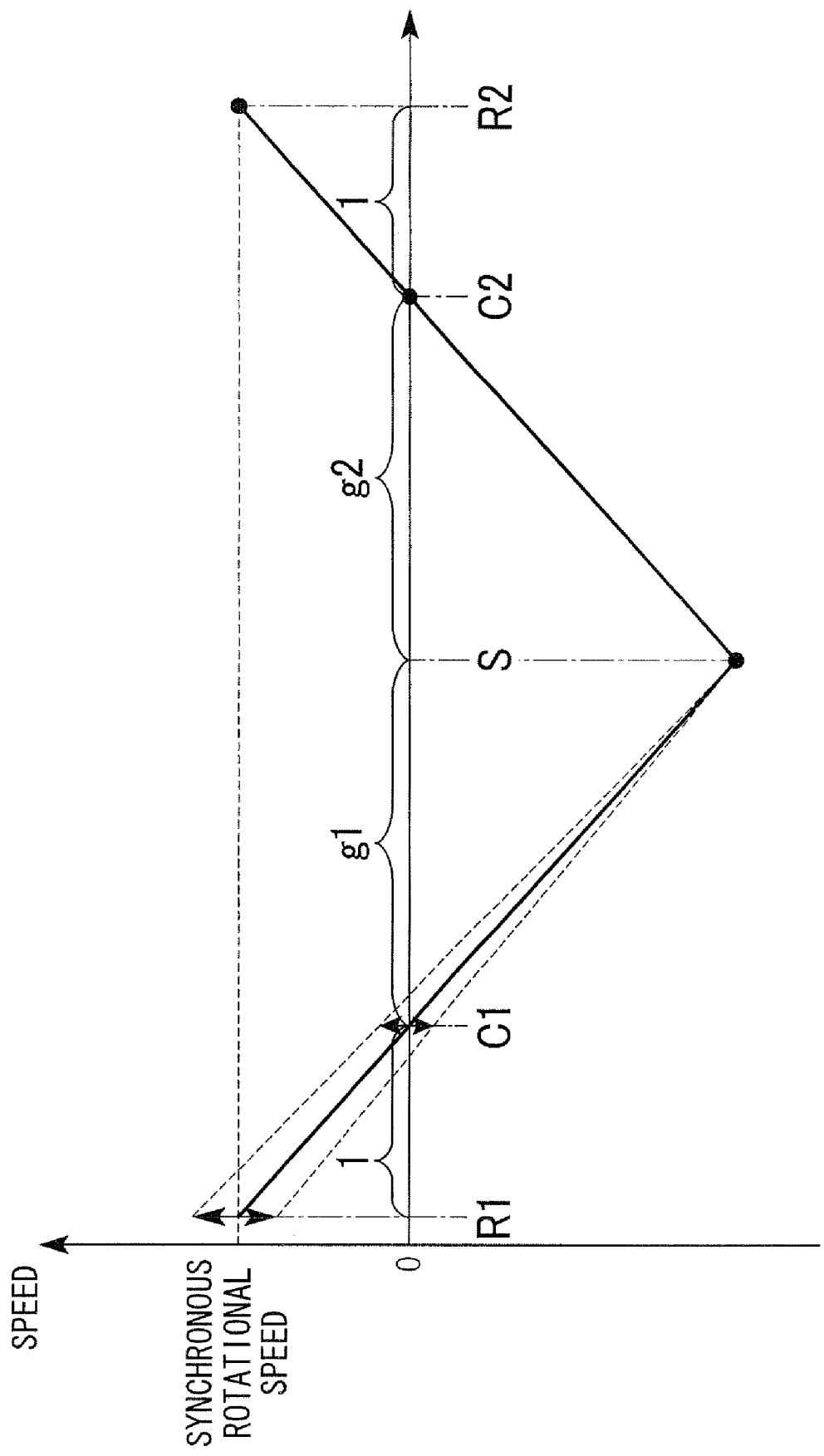
FIG. 18 is a velocity diagram of a planetary gear mechanism according to the second modified example of the embodiment of the present invention.

For example, as with the rotation state of the sun gear (S) 85 shown in FIG. 18, the velocity of the second planetary carrier (C2) 87 with respect to the rotation about the rotation shaft O is zero regardless of the operating state of the actuator 85. Consequently, the second ring gear (R2) 82 and the respective sub permanent magnet mounting layers 22 and 23, with respect to the sun gear (S) 85 rotating in the reverse rotation direction at an appropriate velocity for example, rotate in the forward rotation direction at a velocity according to a gear ratio (that is, speed up ratio) g2 of the sun gear (S) 85 with respect to the second ring gear (R2) 82.

When the actuator 90 is in a non-operating state, the velocity of the first planetary carrier (C1) 86 with respect to the rotation about the rotation shaft O is zero. Therefore, the first ring gear (R1) 81 and main permanent magnet mounting layer 21, with respect to the sun gear (S) 85 rotating in the reverse rotation direction at an appropriate velocity for example, rotate in the forward rotation direction at a velocity according to a gear ratio (that is, speed up ratio) g1 of the sun gear (S) 85 with respect to the first ring gear (R1) 81. Here, the gear ratio g1 and the gear ratio g2 are substantially equal to each other (g1≈g2), and therefore, the main permanent magnet mounting layer 21, and the first sub permanent magnet mounting layer 22 and the second sub permanent magnet mounting layer 23 are in synchronous rotation, and the relative phase between the main permanent magnet mounting layer 21, and the first sub permanent magnet mounting layer 22 and the second sub permanent magnet mounting layer 23 is maintained with no change.

On the other hand, when the actuator 90 is in an operating state (that is to say, it is in a state of executing an advance angle motion or lag angle motion), the velocity of the first planetary carrier (C1) with respect to the rotation about the rotation shaft O is of a value other than zero, and is of an appropriate positive or negative value for the forward rotation direction or reverse rotation direction. Therefore, the first ring gear (R1) 81 and main permanent magnet mounting layer 21, with respect to the sun gear (S) 85 rotating in the reverse rotation direction at an appropriate velocity for example, rotate in the forward rotation direction at a velocity lower than that according to a gear ratio (that is, speed up ratio) g1 of the sun gear (S) 85 with respect to the first ring gear (R1) 81. Here, the gear ratio g1 and the gear ratio g2 are substantially equal to each other (g1≈g2), and therefore, the velocity of the main permanent magnet mounting layer 21, compared to the respective sub permanent magnet mounting layers 22 and 23, is increased or reduced, and the relative phase between the main permanent magnet mounting layer 21, and the first sub permanent magnet mounting layer 22 and the second sub permanent magnet mounting layer 23, changes.

The actuator 90, for the gear ratio (that is, speed up ratio) g1 of the sun gear (S) 85 with respect to the first ring gear (R1) 81 and pole pair number p of the motor 10, is at least capable of turning the first planetary carrier (C1) 86 about the rotation shaft O in the forward rotation direction or in the reverse rotation direction only by mechanical angle of $\theta$ (°)=(180/p)×g1/(1+g1).

Thus, it is possible to change the relative phase between the main permanent magnet mounting layer 21, and the first sub permanent magnet mounting layer 22 and the second sub permanent magnet mounting layer 23, to the advance angle side or lag angle side at least by an electrical angle 180°, and it is possible to set the state of the motor 10 to an appropriate state between the weak magnetic field state and the strong magnetic field state.

The motor 10 according to this second modified example is provided with the above configuration, and a method of driving the motor 10 is described next, with reference to the accompanying drawings.

Figure 19:
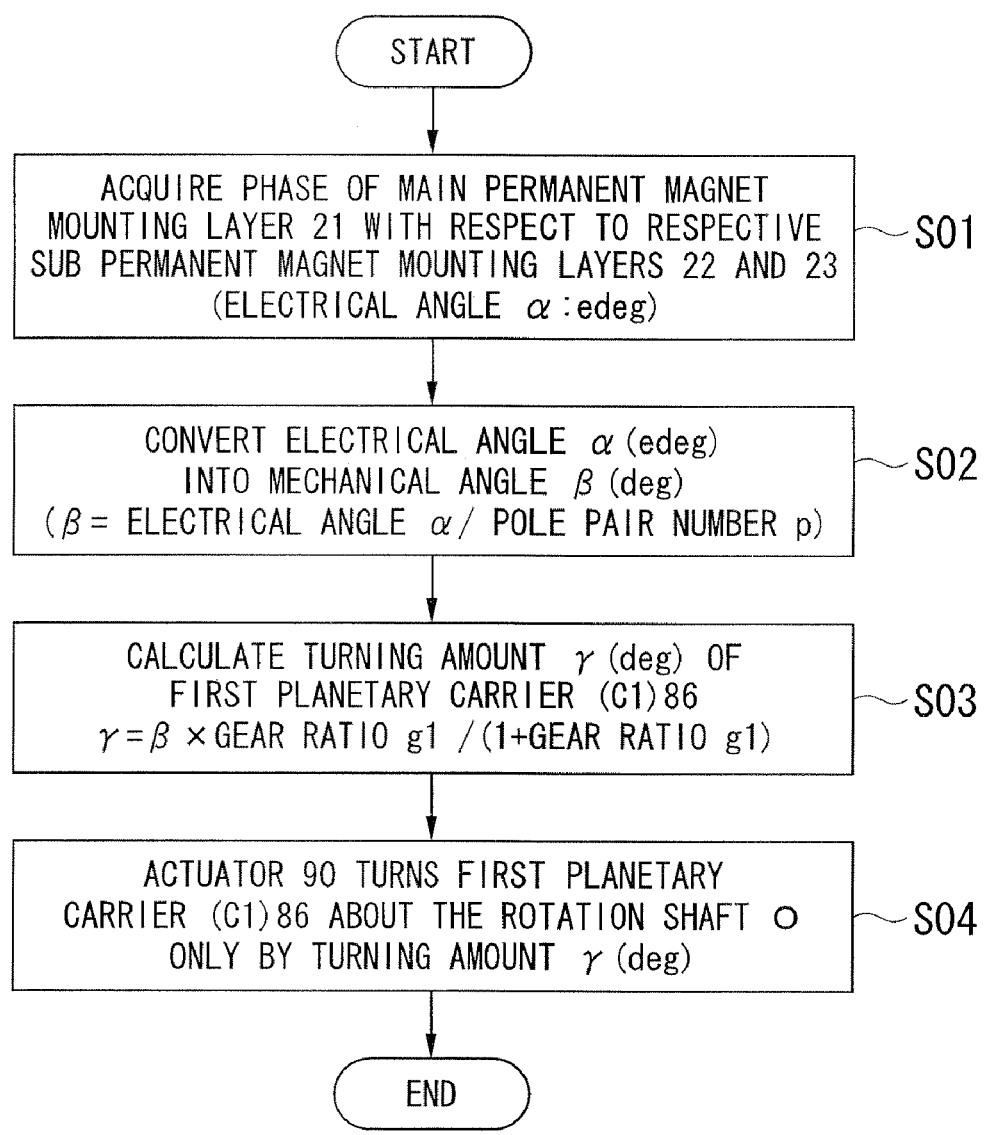
FIG. 19 is a flow chart showing a driving method for the motor according to the second modified example of the embodiment of the present invention.

First, in step S01 shown for example in FIG. 19, a relative phase (electrical angle $\alpha$: edeg) between the main permanent magnet mounting layer 21, and the first sub permanent magnet mounting layer 22 and the second sub permanent magnet mounting layer 23, is acquired by detecting with a rotation sensor or the like for example.

Next, in step S02, the acquired electrical angle of $\alpha$ is converted into a mechanical angle of $\beta$ (=$\alpha/\beta$) according to the pole pair number p of the motor 10.

Then, in step S03, according to the mechanical angle of $\beta$ and the gear ratio g1 of the sun gear (S) 85 with respect to the first ring gear (R1) 81, a turning amount $\gamma$ (=$\beta$×g1/(1+g1)) for turning the first planetary carrier (C1) 86 about the rotation shaft O, is calculated.

In step S04, the actuator 90 turns the first planetary carrier (C1) 86 about the rotation shaft O only by the turning amount $\beta$, and the series of the processing is completed.

According to this second modified example, a plurality of the first planetary gears 83a that form the first planetary gear train 83 and a plurality of the second planetary gears 84a that form the second planetary gear train 84 are capable of rotating about the respective planetary rotation shafts P1 and P2, and they mesh with the sun gear (S) 85, which serves as an idle gear. Thereby, even in a state where a synchronous operation of the main permanent magnet mounting layer 21 and the respective sub permanent magnet mounting layers 22 and 23 is being executed, or in a state where the motor 10 is being stopped, it is possible to easily change the relative phase between the main permanent magnet mounting layer 21, and the first sub permanent magnet mounting layer 22 and the second sub permanent magnet mounting layer 23.

Moreover, since friction in the sun gear (S) 85 can be reduced, a force required for regulating turning of the first planetary carrier (C1) 86 about the rotation shaft O (that is, for maintaining at a predetermined turning position), or a force required for turning-driving, regardless of the level of the rotation velocity or torque of the motor 10, only needs to be greater than the attractive force or repulsive force between the main permanent magnet 21a of the main permanent magnet mounting layer 21 and the respective sub permanent magnets 22a and 23a of the respective sub permanent magnet mounting layers 22 and 23. For example, unlike a brake actuator, it does not require a force greater than the torque that the motor 10 outputs, and enables an efficient phase control.

In addition, without the need of electric power supply, the actuator 90 can turn the first planetary carrier (C1) 86, and it can prevent a reduction in the operating efficiency of the motor 10.

Moreover, the predetermined turning amount when the first planetary carrier (C1) 86 that supports the first planetary gear train 83 turns about the rotation shaft O is set at least to a mechanical angle of θ (°)=(180/p)×g/(1+g1), and it is thereby possible to appropriately shift the state of the motor 10 between the strong magnetic field state and the weak magnetic field state.

In the above described second modified example, the planetary gear mechanism 80 is a single pinion type planetary gear mechanism. However, the planetary gear mechanism 80 is not limited to this, and may be a double pinion type planetary gear mechanism, for example.

INDUSTRIAL APPLICABILITY

The present invention is suitable to be used as a driving source for travelling and as an electric power generator installed on a vehicle.

The invention claimed is:

1. A motor comprising; a rotor capable of rotating about a rotational axis; and a first stator and a second stator that are arranged opposed to each other in the rotational axis direction so as to sandwich said rotor from both sides thereof in said rotational axis direction, wherein
said rotor is provided with: a plurality of main permanent magnets arranged in a circumferential direction, with the magnetization direction thereof parallel with said rotational axis direction; and a first sub permanent magnet and a second sub permanent magnet arranged in the proximity of both end sections in said rotational axis direction of said main permanent magnet, with the magnetization direction thereof parallel with a direction orthogonal to said rotational axis direction and the radial direction, wherein
among two pairs of said first sub permanent magnet and said second sub permanent magnet:
one pair of said first sub permanent magnet and said second sub permanent magnet is arranged in the proximity of an end section on one side in said circumferential direction of said main permanent magnet; and
the other pair of said first sub permanent magnet and said second sub permanent magnet is arranged in the proximity of an end section on the other side in said circumferential direction of said main permanent magnet, and wherein
said rotor is provided with: a first sub permanent magnet mounting layer having said first sub permanent magnets mounted thereon; a main permanent magnet mounting layer that is laminated, in said rotational axis direction, on said first sub permanent magnet mounting layer and that has said main permanent magnets mounted thereon; and a second sub permanent magnet mounting layer that is laminated, in said rotational axis direction, on said main permanent magnet mounting layer and that has said second sub permanent magnets mounted thereon; and there is provided a phase change device that, by turning at least either one of said first sub permanent magnet mounting layer and said second sub permanent magnet mounting layer, and said main permanent magnet mounting layer about the rotational axis, changes the relative phase between said first sub permanent magnet mounting layer and said second sub permanent magnet mounting layer, and said main permanent magnet mounting layer.

2. The motor according to claim 1, wherein
said phase change device is provided with:
a fluid supply device that supplies a fluid; pressure chambers that are provided on said rotational axis of said rotor and that receive a supply of said fluid from said fluid supply device; and
a vane rotor that is integrated at least with either one of said first sub permanent magnet mounting layer and said second sub permanent magnet mounting layer, and said main permanent magnet mounting layer, and that is arranged within said pressure chambers so as to turn, with the pressure of said fluid, about said rotational axis.

3. The motor according to claim 1, wherein
said phase change device is provided with:
a supporting member that, according to the magnetic force between said main permanent magnets, and said first sub permanent magnets and said second sub permanent magnets, and according to the rotational driving force of said main permanent magnet mounting layer, supports said main permanent magnet mounting layer while allowing it to rotate relatively with respect to said first sub permanent magnet mounting layer and said second sub permanent magnet mounting layer; and
a regulating device that regulates turning of said main permanent magnet mounting layer relative to said first sub permanent magnet mounting layer and said second sub permanent magnet mounting layer.

4. The motor according to claim 1, wherein
there is provided a connection section that integrally connects said first sub permanent magnet mounting layer and said second sub permanent magnet mounting layer, and
said phase change device is provided with:
a planetary gear mechanism having a first ring gear that is formed so as to be integrated with and concentric with said main permanent magnet mounting layer, a second ring gear that is formed so as to be integrated with and concentric with either one of said first sub permanent magnet mounting layer and said second sub permanent magnet mounting layer, a first planetary gear that meshes with said first ring gear, a second planetary gear that meshes with said second ring gear, a sun gear that meshes with said first planetary gear and said second planetary gear, and a planetary carrier that rotatably supports either one of said first planetary gear and said second planetary gear and that is capable of turning about said rotational axis; and
a turning device that is connected to said planetary carrier and that turns said planetary carrier about said rotational axis only by a predetermined turning amount.

5. The motor according to claim 4, wherein
there are provided: a stator; and
a second planetary carrier that rotatably supports the other of either said first planetary gear or said second planetary gear and that is fixed on said stator.

6. The motor according to claim 4, wherein said turning device is an actuator that hydraulically or electrically turns said planetary carrier, or that regulates said turning.

7. The motor according to claim 4, wherein said predetermined turning amount is a mechanical angle $\theta(°)=(180/p)\times g/(1+g)$ based on a pole pair number p of said motor and a gear ratio g of said sun gear with respect to either one of said first ring gear and said second ring gear.

8. The motor according to any one of claim 1, and claim 4 through claim 9, wherein said main permanent magnet has a relatively higher residual magnetic flux density compared to at least either one of said first sub permanent magnet and second sub permanent magnet.

9. The motor according to claim 8, wherein said main permanent magnet has a relatively greater magnet gross amount compared to at least either one of said first sub permanent magnet and said second sub permanent magnet.

10. The motor according to claim 8, wherein at least either one of said first sub permanent magnet and said second sub permanent magnet has a relatively higher level of coercive force compared to said main permanent magnet.

11. A motor control device provided with:
the motor according to any one of claim 1, and claim 2 through claim 7;
a power storage device that supplies and receives electric energy to and from said motor; and
a single inverter device that is connected to said first stator and said second stator, and that controls supplying/receiving of electric energy between said motor and said power storage device.

* * * * *